United States Patent
Xue et al.

(10) Patent No.: US 11,937,238 B2
(45) Date of Patent: Mar. 19, 2024

(54) SUPERPOSITION CODED MODULATION FOR SIDELINK COMMUNICATIONS

(71) Applicant: QUALCOMM Incorporated, San Diego, CA (US)

(72) Inventors: Yisheng Xue, San Diego, CA (US); Xiaoxia Zhang, San Diego, CA (US); Chih-Hao Liu, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 205 days.

(21) Appl. No.: 17/452,498

(22) Filed: Oct. 27, 2021

(65) Prior Publication Data

US 2023/0126677 A1    Apr. 27, 2023

(51) Int. Cl.
*H04W 72/20* (2023.01)
*H04L 5/00* (2006.01)
*H04W 52/34* (2009.01)

(52) U.S. Cl.
CPC ........... *H04W 72/20* (2023.01); *H04L 5/0048* (2013.01); *H04W 52/34* (2013.01)

(58) Field of Classification Search
CPC ... H04W 72/20; H04W 52/34; H04W 52/383; H04W 4/40; H04W 52/247; H04L 5/0048; H04L 5/0044; H04L 5/0053; H04L 5/0051; H04L 25/022; H04L 5/0094

See application file for complete search history.

(56) References Cited

U.S. PATENT DOCUMENTS

| | | | |
|---|---|---|---|
| 8,699,595 B2* | 4/2014 | Martinez | H04L 25/022 375/267 |
| 2017/0230956 A1* | 8/2017 | Kim | H04L 5/0032 |
| 2017/0367087 A1* | 12/2017 | Seo | H04W 72/51 |
| 2020/0383130 A1* | 12/2020 | Bar-Or Tillinger | H04L 5/0094 |

(Continued)

FOREIGN PATENT DOCUMENTS

| | | | | |
|---|---|---|---|---|
| WO | WO-2019200602 A1 * | 10/2019 | | |
| WO | WO-2020153749 A1 * | 7/2020 | | H04L 1/1812 |

OTHER PUBLICATIONS

Sharief Abdel-Razeq, "Superposition coded OFDM transmission in a downlink cooperative relay network based on statistical channel state information", Dec. 8, 2017, 1049*/iet-com.2018.5263 (Year: 2017).*

(Continued)

*Primary Examiner* — Ayaz R Sheikh
*Assistant Examiner* — Louis Samara
(74) *Attorney, Agent, or Firm* — Harrity & Harrity LLP / Qualcomm

(57) ABSTRACT

Various aspects of the present disclosure generally relate to wireless communication. In some aspects, a user equipment (UE) may encode, for a first set of resource elements (REs), a first layer for sidelink control information. The UE may encode, for a second set of REs, a second layer for sidelink data, wherein the first set of REs and the second set of REs are associated with a same one or more symbols. The UE may transmit, to another UE and based at least in part on applying superposition coded modulation (SCM) to the first layer and the second layer, the sidelink control information using the first set of REs and the sidelink data using the second set of REs. Numerous other aspects are described.

30 Claims, 14 Drawing Sheets

(56) References Cited

U.S. PATENT DOCUMENTS

| | | | | |
|---|---|---|---|---|
| 2021/0184909 A1* | 6/2021 | Han | ................... | H04L 27/3488 |
| 2021/0337485 A1* | 10/2021 | Ryu | ................... | H04W 52/247 |
| 2022/0015139 A1* | 1/2022 | Kim | ........................ | H04L 5/00 |
| 2023/0089655 A1* | 3/2023 | Yeo | ...................... | H04L 5/0092 |
| | | | | 370/329 |

OTHER PUBLICATIONS

Stefan Pratschner, Versatile mobile communications simulation: the Vienna 5G Link Level Simulator, EURASIP Journal on Wireless Communication and Networking, https://doi.org/10.1186/s13638-018-1239-6 (Year: 2018).*

Alessandro Bazzi, "on the Design of Sidelink for Cellular V2X: A literature Review and Outlook for Future", IEEE Access, May 28, 2021 (Year: 2021).*

* cited by examiner

US 11,937,238 B2

SUPERPOSITION CODED MODULATION FOR SIDELINK COMMUNICATIONS

FIELD OF THE DISCLOSURE

Aspects of the present disclosure generally relate to wireless communication and to techniques and apparatuses for superposition coded modulation (SCM) for sidelink communications.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a UE for wireless communication. The UE may include a memory and one or more processors coupled to the memory. The one or more processors may be configured to encode, for a first set of resource elements (REs), a first layer for sidelink control information. The one or more processors may be configured to encode, for a second set of REs, a second layer for sidelink data. The one or more processors may be configured to transmit, to another UE and based at least in part on applying superposition coded modulation (SCM) to the first layer and the second layer, the sidelink control information using the first set of REs and the sidelink data using the second set of REs.

Some aspects described herein relate to a method of wireless communication performed by a UE. The method may include encoding, for a first set of REs, a first layer for sidelink control information. The method may include encoding, for a second set of REs, a second layer for sidelink data, where the first set of REs and the second set of REs are associated with a same one or more symbols. The method may include transmitting, to another UE and based at least in part on applying SCM to the first layer and the second layer, the sidelink control information using the first set of REs and the sidelink data using the second set of REs.

Some aspects described herein relate to a non-transitory computer-readable medium that stores a set of instructions for wireless communication by a UE. The set of instructions, when executed by one or more processors of the UE, may cause the UE to encode, for a first set of REs, a first layer for sidelink control information. The set of instructions, when executed by one or more processors of the UE, may cause the UE to encode, for a second set of REs, a second layer for sidelink data. The set of instructions, when executed by one or more processors of the UE, may cause the UE to transmit, to another UE and based at least in part on applying SCM to the first layer and the second layer, the sidelink control information using the first set of REs and the sidelink data using the second set of REs.

Some aspects described herein relate to an apparatus for wireless communication. The apparatus may include means for encoding, for a first set of REs, a first layer for sidelink control information. The apparatus may include means for encoding, for a second set of REs, a second layer for sidelink data, where the first set of REs and the second set of REs are associated with a same one or more symbols. The apparatus may include means for transmitting, to a UE and based at least in part on applying SCM to the first layer and the second layer, the sidelink control information using the first set of REs and the sidelink data using the second set of REs.

Some aspects described herein relate to a UE for wireless communication. The UE may include a memory and one or more processors coupled to the memory. The one or more processors may be configured to receive, from another UE, a first layer associated with a first set of REs and sidelink control information and a second layer associated with a second set of REs and sidelink data, where the first layer and the second layer are modulated using SCM, and where the first set of REs and the second set of REs are associated with a same one or more symbols. The one or more processors may be configured to decode the first set of REs to obtain information included in the sidelink control information. The one or more processors may be configured to decode, based at least in part on decoding the first set of REs, the second set of REs to obtain information included in the sidelink data.

Some aspects described herein relate to a method of wireless communication performed by a UE. The method may include receiving, from another UE, a first layer associated with a first set of REs and sidelink control information and a second layer associated with a second set of REs and sidelink data, where the first layer and the second layer are modulated using SCM, and where the first set of REs and the second set of REs are associated with a same one or more symbols. The method may include decoding the first set of REs to obtain information included in the sidelink control information. The method may include decoding, based at least in part on decoding the first set of REs, the second set of REs to obtain information included in the sidelink data.

Some aspects described herein relate to a non-transitory computer-readable medium that stores a set of instructions for wireless communication by a UE. The set of instructions, when executed by one or more processors of the UE, may cause the UE to receive, from another UE, a first layer associated with a first set of REs and sidelink control information and a second layer associated with a second set of REs and sidelink data, where the first layer and the second layer are modulated using SCM, and where the first set of REs and the second set of REs are associated with a same one or more symbols. The set of instructions, when executed by one or more processors of the UE, may cause the UE to decode the first set of REs to obtain information included in the sidelink control information. The set of instructions, when executed by one or more processors of the UE, may cause the UE to decode, based at least in part on decoding the first set of REs, the second set of REs to obtain information included in the sidelink data.

Some aspects described herein relate to an apparatus for wireless communication. The apparatus may include means for receiving, from a UE, a first layer associated with a first set of REs and sidelink control information and a second layer associated with a second set of REs and sidelink data, where the first layer and the second layer are modulated using SCM, and where the first set of REs and the second set of REs are associated with a same one or more symbols. The apparatus may include means for decoding the first set of REs to obtain information included in the sidelink control information. The apparatus may include means for decoding, based at least in part on decoding the first set of REs, the second set of REs to obtain information included in the sidelink data.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
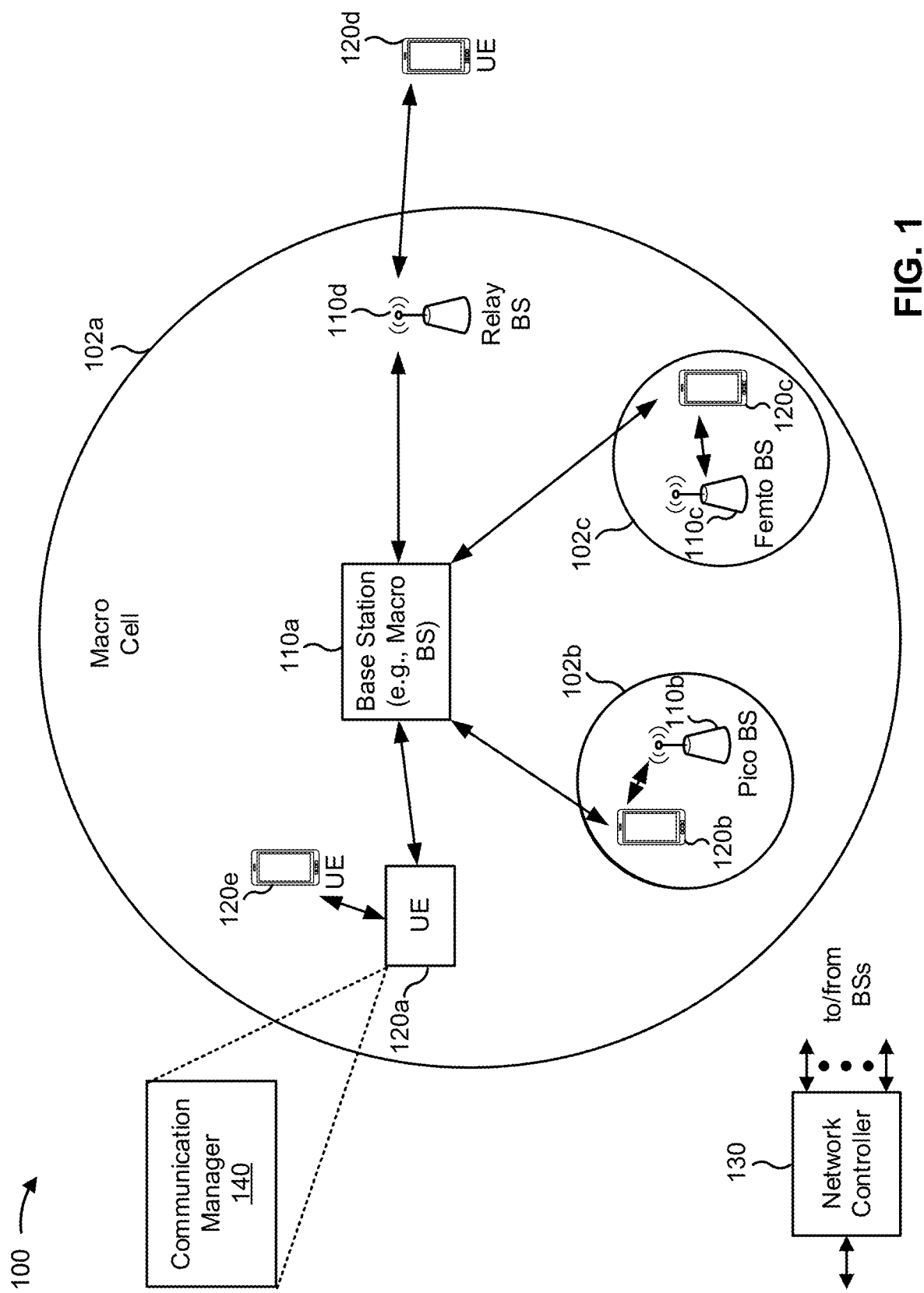
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may encode, for a first set of resource elements (REs), a first layer for sidelink control information; encode, for a second set of REs, a second layer for sidelink data, wherein the first set of REs and the second set of REs are associated with a same one or more symbols; and transmit, to another UE and based at least in part on applying superposition coded modulation (SCM) to the first layer and the second layer, the sidelink control information using the first set of REs and the sidelink data using the second set of REs.

Additionally, or alternatively, the communication manager 140 may receive, from another UE, a first layer associated with a first set of REs and sidelink control information and a second layer associated with a second set of REs and sidelink data, wherein the first layer and the second layer are modulated using SCM, and wherein the first set of REs and the second set of REs are associated with a same one or more symbols; and decode the first set of REs to obtain information included in the sidelink control information; and decode, based at least in part on decoding the first set of REs, the second set of REs to obtain information included in the sidelink data. Additionally, or alternatively, the communication manager 140 may perform one or more other operations described herein.

As indicated above, FIG. 1 is provided as an example. Other examples may differ from what is described with regard to FIG. 1.

Figure 2:
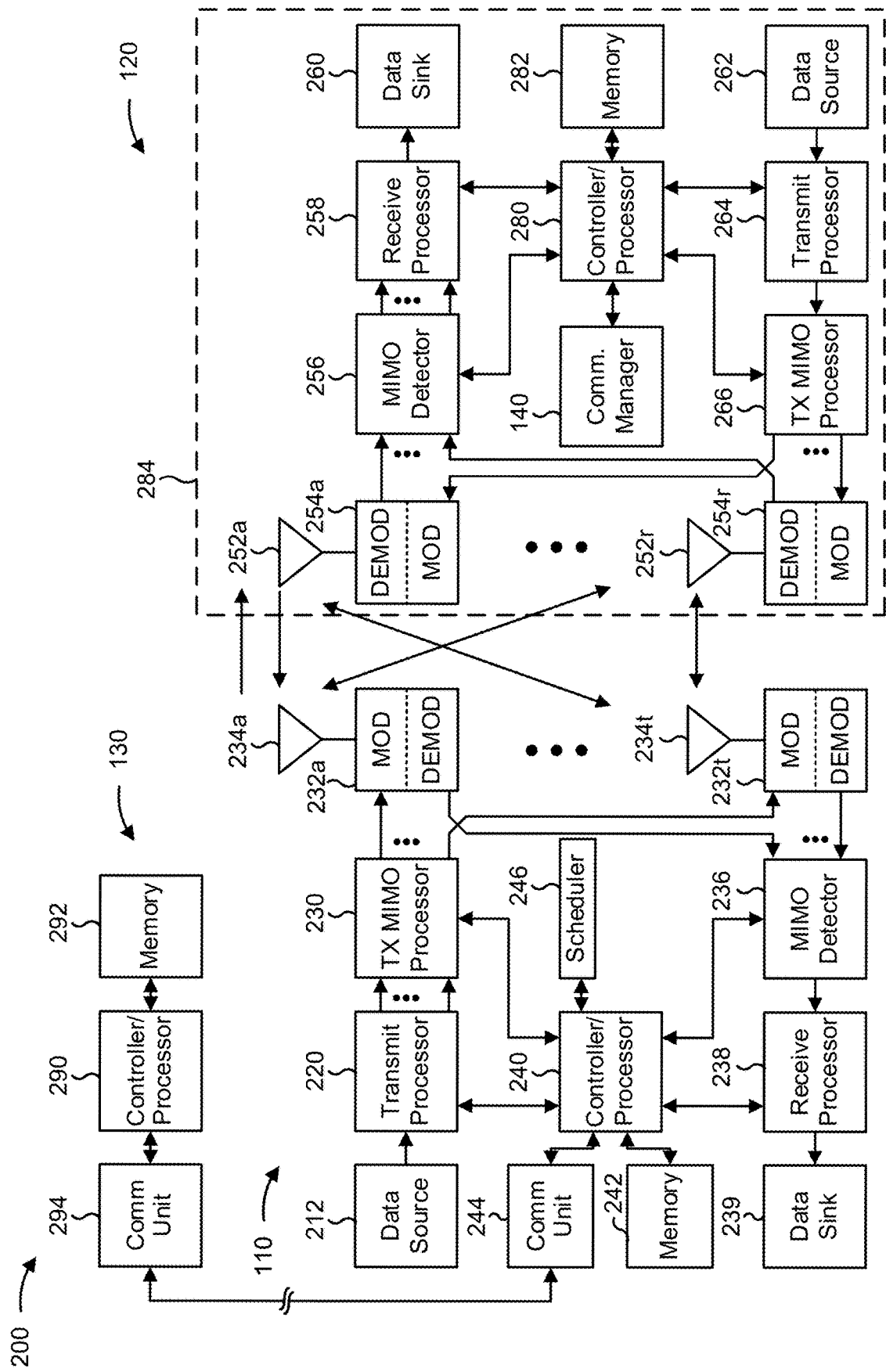
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7A, 7B, 7C, 7D, 8, 9, 10, and 11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7A, 7B, 7C, 7D, 8, 9, 10, and 11).

The controller/processor 240 of the base station 110, the controller/processor 280 of the UE 120, and/or any other component(s) of FIG. 2 may perform one or more techniques associated with SCM for sidelink communications, as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, the UE 120 includes means for encoding, for a first set of REs, a first layer for sidelink control information; means for encoding, for a second set of REs, a second layer for sidelink data, wherein the first set of REs and the second set of REs are associated with a same one or more symbols; and/or means for transmitting, to another UE and based at least in part on applying SCM to the first layer and the second layer, the sidelink control information using the first set of REs and the sidelink data using the second set of REs. Additionally, or alternatively, the UE 120 includes means for receiving, from another UE, a first layer associated with a first set of REs and sidelink control information and a second layer associated with a second set of REs and sidelink data, wherein the first layer and the second layer are modulated using SCM, and wherein the first set of REs and the second set of REs are associated with a same one or more symbols; and/or means for decoding the first set of REs to obtain information included in the sidelink control information; and/or means for decoding, based at least in part on decoding the first set of REs, the second set of REs to obtain information included in the sidelink data. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
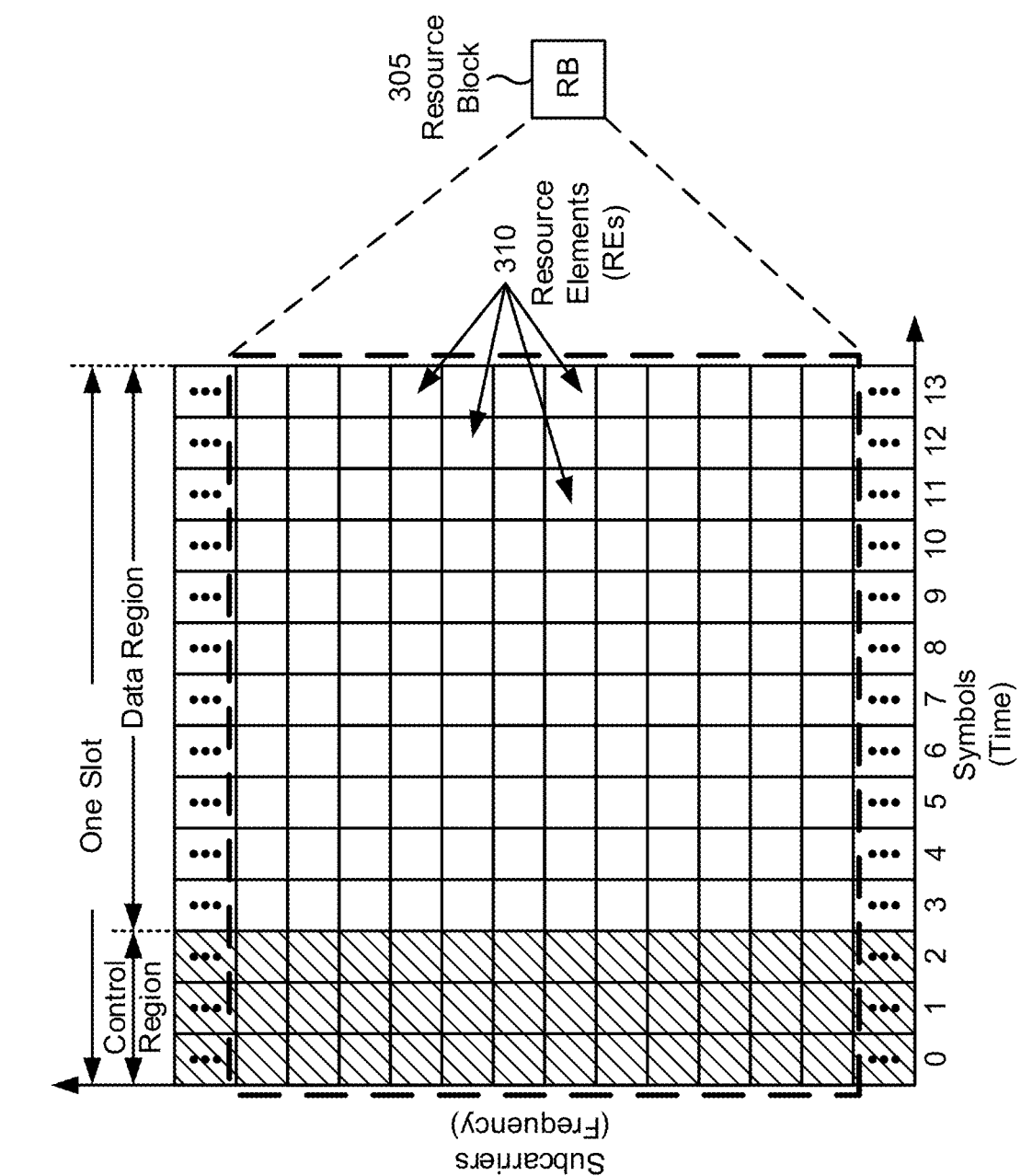
FIG. 3 is a diagram illustrating an example of a slot format, in accordance with the present disclosure.

FIG. 3 is a diagram illustrating an example 300 of a slot format, in accordance with the present disclosure. As shown in FIG. 3, time-frequency resources in a radio access network may be partitioned into resource blocks, shown by a single resource block (RB) 305. An RB 305 is sometimes referred to as a physical resource block (PRB). An RB 305 includes a set of subcarriers (e.g., 12 subcarriers) and a set of symbols (e.g., 14 symbols) that are schedulable by a base station 110 as a unit. In some examples, an RB 305 may include a set of subcarriers in a single slot. As shown, a single time-frequency resource included in an RB 305 may be referred to as a resource element (RE) 310. An RE 310 may include a single subcarrier (e.g., in frequency) and a single symbol (e.g., in time). A symbol may be referred to as an orthogonal frequency division multiplexing (OFDM) symbol. An RE 310 may be used to transmit one modulated symbol, which may be a real value or a complex value.

In some telecommunication systems (e.g., NR), RBs 305 may span 12 subcarriers with a subcarrier spacing of, for example, 15 kilohertz (kHz), 30 kHz, 60 kHz, or 120 kHz, among other examples, over a 0.1 millisecond (ms) duration. A radio frame may include 40 slots and may have a length of 10 ms. Consequently, each slot may have a length of 0.25 ms. However, a slot length may vary depending on a numerology used to communicate (e.g., a subcarrier spacing and/or a cyclic prefix format). A slot may be configured with a link direction (e.g., downlink, uplink, or sidelink) for transmission. In examples, the link direction for a slot may be dynamically configured.

As indicated above, FIG. 3 is provided as an example. Other examples may differ from what is described with respect to FIG. 3.

Figure 4:
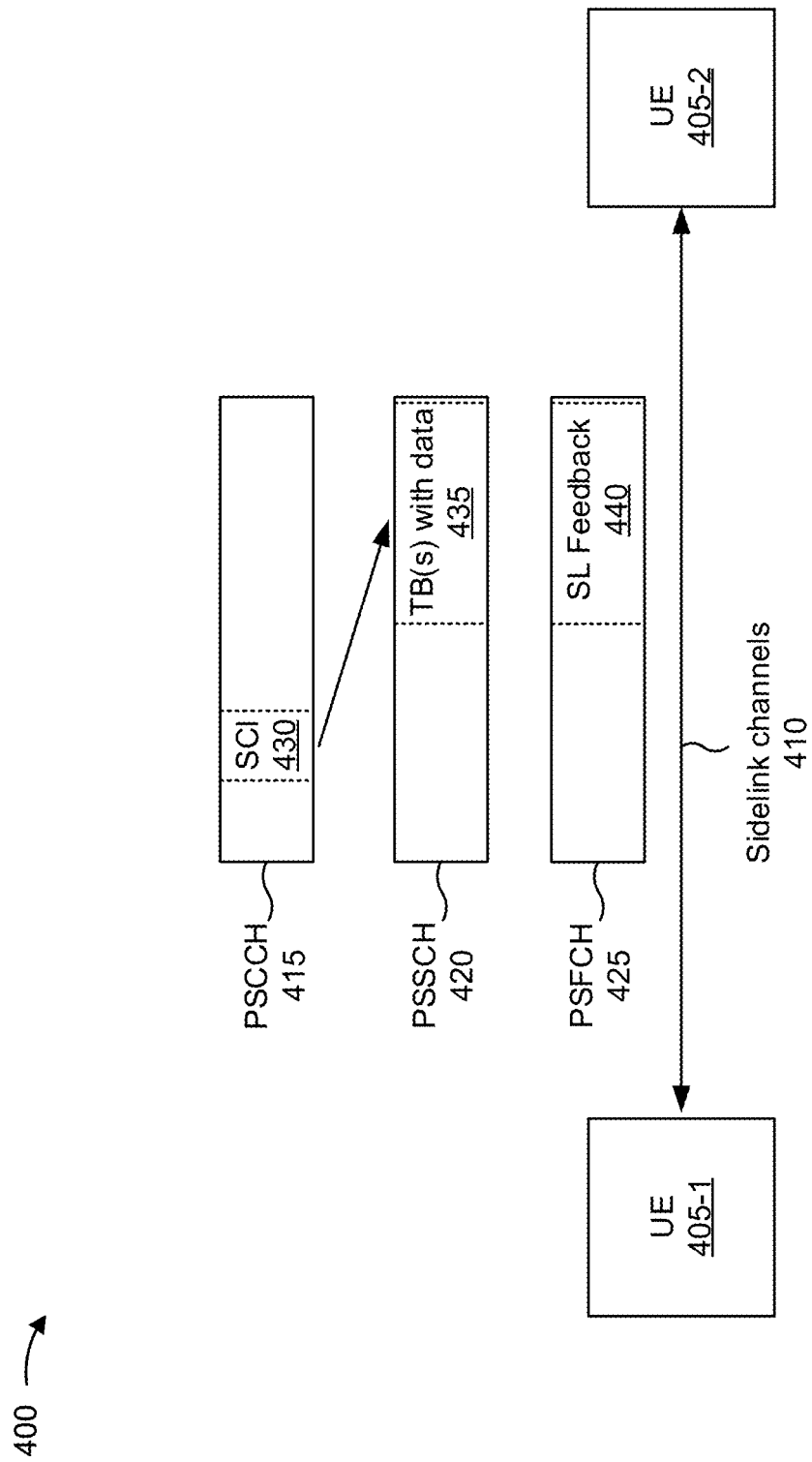
FIG. 4 is a diagram illustrating an example of sidelink communications, in accordance with the present disclosure.

FIG. 4 is a diagram illustrating an example 400 of sidelink communications, in accordance with the present disclosure.

As shown in FIG. 4, a first UE 405-1 may communicate with a second UE 405-2 (and one or more other UEs 405) via one or more sidelink channels 410. The UEs 405-1 and 405-2 may communicate using the one or more sidelink channels 410 for P2P communications, D2D communications, V2X communications (e.g., which may include V2V communications, V2I communications, and/or vehicle to pedestrian (V2P) communications) and/or mesh networking. In some examples, the UEs 405 (e.g., UE 405-1 and/or UE 405-2) may correspond to one or more other UEs described elsewhere herein, such as UE 120. In some examples, the one or more sidelink channels 410 may use a PC5 interface and/or may operate in a high frequency band (e.g., the 5.9 GHz band). Additionally, or alternatively, the UEs 405 may synchronize timing of transmission time intervals (TTIs) (e.g., frames, subframes, slots, or symbols) using global navigation satellite system (GNSS) timing.

As further shown in FIG. 4, the one or more sidelink channels 410 may include a physical sidelink control channel (PSCCH) 415, a physical sidelink shared channel (PSSCH) 420, and/or a physical sidelink feedback channel (PSFCH) 425. The PSCCH 415 may be used to communicate control information, similar to a physical downlink control channel (PDCCH) and/or a physical uplink control channel (PUCCH) used for cellular communications with a base station 110 via an access link or an access channel. The PSSCH 420 may be used to communicate data, similar to a physical downlink shared channel (PDSCH) and/or a physical uplink shared channel (PUSCH) used for cellular communications with a base station 110 via an access link or an access channel. For example, the PSCCH 415 may carry sidelink control information (SCI) 430, which may indicate various control information used for sidelink communications, such as one or more resources (e.g., time resources, frequency resources, and/or spatial resources) where a transport block (TB) 435 may be carried on the PSSCH 420. The TB 435 may include data. The PSFCH 425 may be used to communicate sidelink feedback 440, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 415, in some examples, the SCI 430 may include multiple communications in different stages, such as a first stage SCI (SCI-1) and a second stage SCI (SCI-2). The SCI-1 may be transmitted on the PSCCH 415. The SCI-2 may be transmitted on the PSSCH 420. The SCI-1 may include, for example, an indication of one or more resources (e.g., time resources, frequency resources, and/or spatial resources) on the PSSCH 420, information for decoding sidelink communications on the PSSCH, a quality of service (QoS) priority value, a resource reservation period, a PSSCH demodulation reference signal (DMRS) pattern, an SCI format for the SCI-2, a beta offset for the SCI-2, a quantity of PSSCH DMRS ports, and/or a modulation and coding scheme (MCS). The SCI-2 may include information associated with data transmissions on the PSSCH 420, such as a hybrid automatic repeat request (HARQ) process ID, a new data indicator (NDI), a source identifier, a destination identifier, and/or a channel state information (CSI) report trigger.

As used herein, sidelink "data" may refer to a TB, a packet, and/or other information that is being communicated over a sidelink channel. Sidelink data may be contrasted from control information in that the control information (e.g., SCI) indicates, or defines, how the sidelink data is to be communicated over the sidelink channel. For example, sidelink data may be communicated via a data plane and SCI may be communicated via a control plane. In other words, control information, or SCI, may include information that indicates how a UE is to transmit and/or receive sidelink data, whereas sidelink data is that actual information being communicated over the sidelink channel.

In some examples, the one or more sidelink channels 410 may use resource pools. For example, a scheduling assignment (e.g., included in SCI 430) may be transmitted in sub-channels using specific resource blocks (RBs) across time. In some examples, data transmissions (e.g., on the PSSCH 420) associated with a scheduling assignment may occupy adjacent RBs in the same subframe as the scheduling assignment (e.g., using frequency division multiplexing). In some examples, a scheduling assignment and associated data transmissions are not transmitted on adjacent RBs.

In some examples, a UE 405 may operate using a sidelink transmission mode (e.g., Mode 1) where resource selection and/or scheduling is performed by a base station 110. For example, the UE 405 may receive a grant (e.g., in downlink control information (DCI) or in a radio resource control (RRC) message, such as for configured grants) from the base station 110 for sidelink channel access and/or scheduling. In some examples, a UE 405 may operate using a transmission mode (e.g., Mode 2) where resource selection and/or scheduling is performed by the UE 405 (e.g., rather than a base station 110). In some examples, the UE 405 may perform resource selection and/or scheduling by sensing channel availability for transmissions. For example, the UE 405 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, and/or may measure a reference signal received quality (RSRQ) parameter (e.g., a PSSCH-RSRQ parameter) associated with various sidelink channels, and may select a channel for transmission of a sidelink communication based at least in part on the measurement(s).

Additionally, or alternatively, the UE 405 may perform resource selection and/or scheduling using SCI 430 received in the PSCCH 415, which may indicate occupied resources and/or channel parameters. Additionally, or alternatively, the UE 405 may perform resource selection and/or scheduling by determining a channel busy rate (CBR) associated with various sidelink channels, which may be used for rate control (e.g., by indicating a maximum number of resource blocks that the UE 405 can use for a particular set of subframes).

In the transmission mode where resource selection and/or scheduling is performed by a UE 405, the UE 405 may generate sidelink grants, and may transmit the grants in SCI 430. A sidelink grant may indicate, for example, one or more parameters (e.g., transmission parameters) to be used for an upcoming sidelink transmission, such as one or more resource blocks to be used for the upcoming sidelink transmission on the PSSCH 420 (e.g., for TBs 435), one or more subframes to be used for the upcoming sidelink transmission, and/or a modulation and coding scheme (MCS) to be used for the upcoming sidelink transmission. In some examples, a UE 405 may generate a sidelink grant that indicates one or more parameters for semi-persistent scheduling (SPS), such as a periodicity of a sidelink transmission. Additionally, or alternatively, the UE 405 may generate a sidelink grant for event-driven scheduling, such as for an on-demand sidelink message.

In some examples, sidelink communication may use slot-based scheduling. Slot-based scheduling may use a slot as a minimum time unit for resource scheduling in the time domain (e.g., a minimum amount of time that can be reserved for a sidelink communication is a slot). In some other examples, sidelink communication may use mini-slot-based scheduling. A mini-slot may include a lesser quantity of symbols than a quantity of OFDM symbols included in a slot. For example, a mini-slot may include 1, 2, 4, 7, and/or another quantity of OFDM symbols. A mini-slot may be positioned asynchronously with the start of a slot. For example, a mini-slot may be a unit of scheduling that is smaller than a slot (e.g., a mini-slot may be a portion of a slot). In some examples, a mini-slot may include one or more data symbols that represent data. Additionally, or alternatively, the mini-slot may include one or more control symbols that represent control information associated with the mini-slot. In some aspects, the one or more control symbols may be at or near a beginning of the mini-slot (e.g., in the first two symbols of the mini-slot) or at or near an end of the mini-slot (e.g., in the last symbol of the mini-slot.) Alternatively, the mini-slot may not include a control symbol.

Additionally, or alternatively, the mini-slot may include a reference symbol that carries information associated with demodulating data included in the mini-slot (e.g., a DMRS). Alternatively, the mini-slot may not include a reference symbol. In some examples, the mini-slot may have a subcarrier spacing that is the same as a subcarrier spacing of the slot in which the mini-slot is included. Alternatively, the mini-slot may have a subcarrier spacing that differs from the subcarrier spacing of the slot in which the mini-slot is included. In some examples, increasing the subcarrier spacing of the mini-slot relative to the subcarrier spacing of the slot may allow for additional symbols to be included in the mini-slot. For example, if the mini-slot has a same subcarrier spacing as the slot (e.g., 30 kilohertz (kHz)), then the mini-slot may include a particular number of symbols (e.g., 2 symbols). However, if the mini-slot has a subcarrier spacing that is greater than (e.g., two times) the subcarrier spacing (e.g., 2×30 kHz=60 kHz), then the mini-slot may include a greater number (e.g., two times) the particular number of symbols (e.g., 2×2 symbols=4 symbols).

Using mini-slot based scheduling for sidelink communications may increase a flexibility for reserving sidelink resources and/or may reduce a latency associated with sidelink communication. However, mini-slot based scheduling may be associated with increased signaling overhead because more granular resource reservations may be made, thereby resulting in an increased quantity of resource reservations being transmitted in the sidelink network.

As indicated above, FIG. 4 is provided as an example. Other examples may differ from what is described with respect to FIG. 4.

Figure 5:
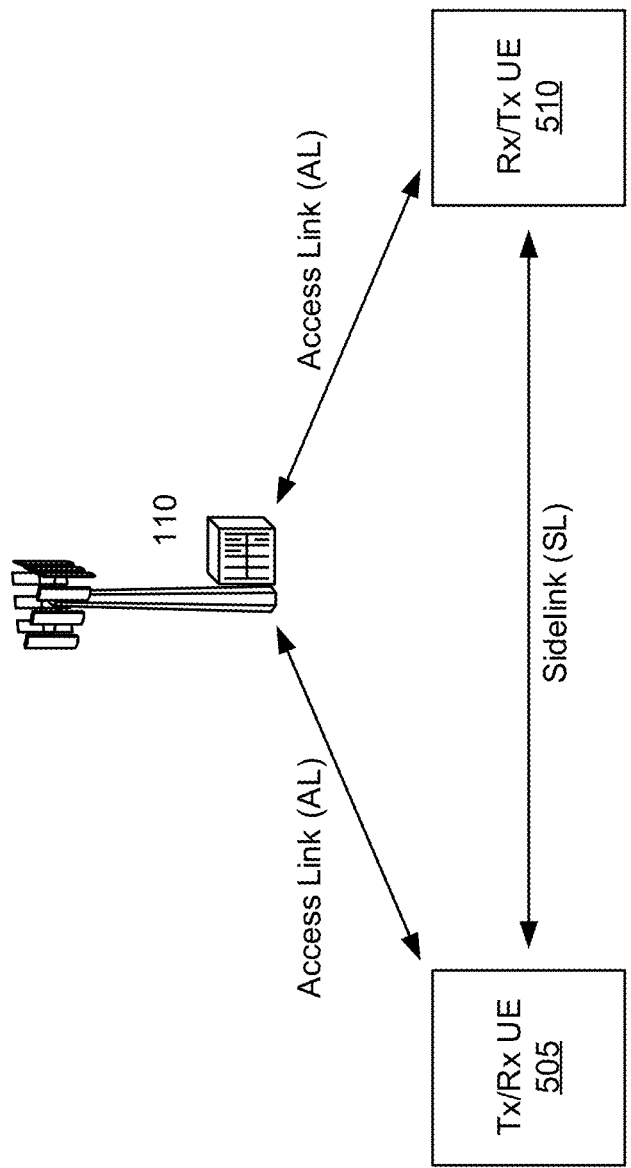
FIG. 5 is a diagram illustrating an example of sidelink communications and access link communications, in accordance with the present disclosure.

FIG. 5 is a diagram illustrating an example 500 of sidelink communications and access link communications, in accordance with the present disclosure.

As shown in FIG. 5, a transmitter (Tx)/receiver (Rx) UE 505 and an Rx/Tx UE 510 may communicate with one another via a sidelink, as described above in connection with FIG. 4. As further shown, in some sidelink modes, a base station 110 may communicate with the Tx/Rx UE 505 via a first access link. Additionally, or alternatively, in some sidelink modes, the base station 110 may communicate with the Rx/Tx UE 510 via a second access link. The Tx/Rx UE 505 and/or the Rx/Tx UE 510 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 5 is provided as an example. Other examples may differ from what is described with respect to FIG. 5.

Figure 6:
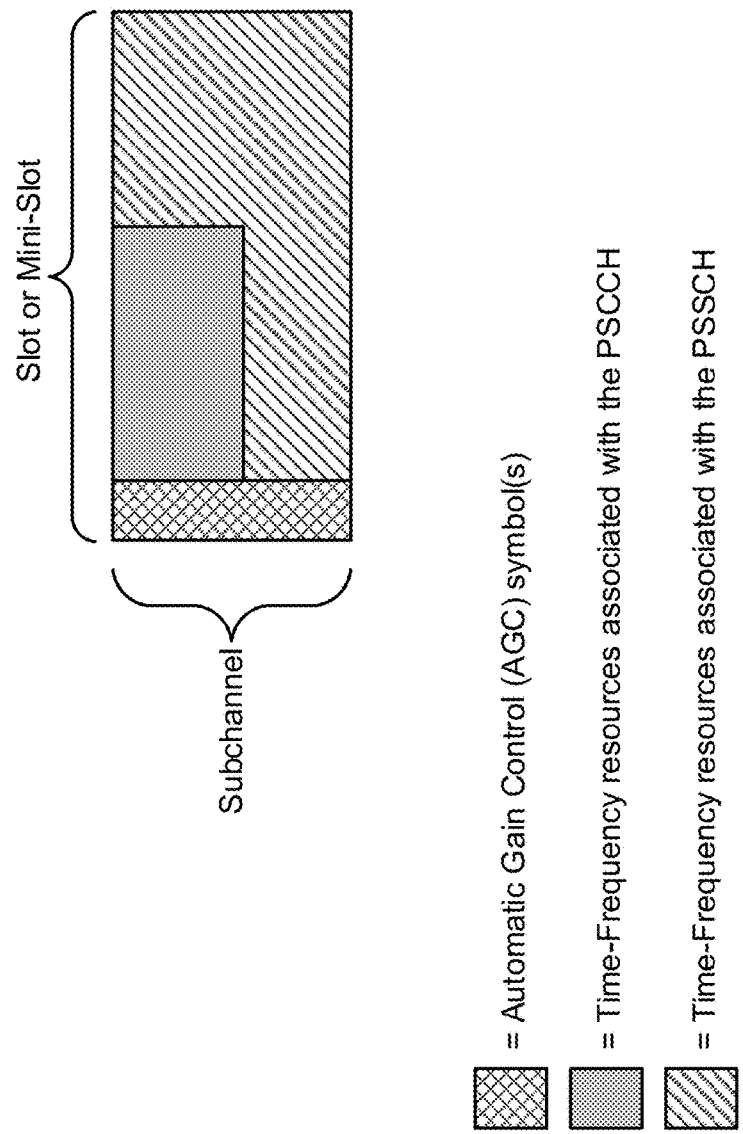
FIG. 6 is a diagram illustrating an example of sidelink slot structure, in accordance with the present disclosure.

FIG. 6 is a diagram illustrating an example 600 of sidelink slot structure, in accordance with the present disclosure. As shown in FIG. 6, an example of allocation of resources within a slot or a mini-slot may include an allocation of resources for automatic gain control (AGC) operations, for transmissions associated with one or more PSCCHs, and/or for transmissions associated with one or more PSSCHs, among other examples.

In some examples, a receiving device that may be attempting to receive a signal for a particular slot may perform AGC training, which refers to mechanisms to tune or otherwise configure a radio frequency front end (RFFE) and/or other receive components to match the received signal power and thereby prevent the receive components from becoming saturated. For example, AGC is often implemented using one or more circuits (e.g., a closed-loop feedback regulating circuit) to maintain a stable signal level at an output stage regardless of variations in the signal level at an input stage. A UE may use one or more symbols (e.g., at a start of a slot or mini-slot) to perform AGC training.

As shown in FIG. 6, one or more (or all) symbols in the slot or the mini-slot may be allocated for sidelink communications. For example, the slot or the mini-slot may include a first set of time-frequency resources (e.g., one or more REs) that are associated with sidelink control communications (e.g., PSCCH communications) and a second set of time-frequency resources (e.g., one or more REs) that are associated with sidelink data communications (e.g., PSSCH communications). As shown in FIG. 6, the symbol(s) in the slot or the mini-slot that are allocated for sidelink communications may be split between sidelink control communications (e.g., PSCCH communications) and sidelink data communications (e.g., PSSCH communications). For example, a first portion of the time-frequency resources associated with the symbol(s) in the slot or the mini-slot that are allocated for sidelink communications may be allocated for sidelink control communications (e.g., PSCCH communications). A second portion of the time-frequency resources associated with the symbol(s) in the slot or the mini-slot that are allocated for sidelink communications may be allocated for sidelink data communications (e.g., PSSCH communications).

As a result, sidelink data may be transmitted over only a portion of the time-frequency resources associated with the symbol(s) in the slot or the mini-slot that are allocated for sidelink communications. The remaining time-frequency resources may be reserved for sidelink control communications (e.g., PSCCH communications). Therefore, a spectral efficiency of the sidelink communications may be degraded because of the time-frequency resources that are reserved for the sidelink control communications (e.g., PSCCH communications) (e.g., because sidelink data cannot be transmitted using the time-frequency resources that are reserved for the sidelink control communications). Moreover, when mini-slots are used in a sidelink network (e.g., to reduce latency associated with sidelink communications), this problem is compounded because an overhead associated with transmitting sidelink control information is increased when mini-slots are used (e.g., because there are an increased number or frequency of transmission opportunities when mini-slots are used, resulting in an increased number of sidelink control transmissions).

Some techniques and apparatuses described herein enable SCM for sidelink communications. For example, a UE may apply SCM to sidelink control information and sidelink data. For example, a UE may encode a first layer (e.g., and a first set of REs) for sidelink control information. The UE may encode a second layer (e.g., and a second set of REs) for sidelink data. The UE may modulate the first layer and the second layer using SCM to enable the UE to transmit the first layer and the second layer (e.g., to transmit the sidelink control information and the sidelink data) using a same one or more symbols. As a result, a spectral efficiency and/or a capacity associated with sidelink communication may be improved. For example, time-frequency resources for sidelink control and sidelink data are not limited to portions or subsets of time-frequency resources of a slot or a mini-slot. Therefore, the UE may use an increased capacity to transmit both sidelink control information and sidelink data based at least in part on applying SCM. Additionally, applying SCM to sidelink communications may alleviate a signaling overhead associated with sidelink control signaling when mini-slots are used (e.g., because sidelink data may occupy the same REs as the sidelink control information by transmitting the sidelink data and the sidelink control information in different layers). As a result, the UE may be enabled to use mini-slot scheduling for sidelink communications, thereby reducing a latency associated with the sidelink communications.

In some aspects, the first set of REs and the second set of REs may be associated with the same one or more symbols and overlap in time. The first set of REs and the second set of REs may be the same or different. For example, the second set of REs may be a subset of REs from the first set of REs. The UE may transmit the first layer (e.g., associated with sidelink control information and/or the PSCCH) using a first transmit power level and may transmit the second layer (e.g., associated with sidelink data and/or the PSSCH) using a second transmit power level. The first transmit power level may be greater than the second transmit power level. A difference between the first transmit power level and the second transmit power level may be referred to herein as an "insertion loss."

For example, a wireless network may support a higher-order modulation technique for sidelink communications that enables superposition coding, such as SCM or multi-user superposition transmission (MUST), among other examples. Superposition coding may enable a UE to concurrently or jointly transmit multiple sidelink communications (e.g., via a single sidelink subchannel). For example, SCM is a technique that enables transmitting independent information in different layers by superposing the information with each other. SCM enables a UE to transmit signals by superimposing independent binary coded sequences for different layers.

Additionally, some wireless networks support multi-layer transmission (e.g., multi-beam transmission from a UE). Different layers map to different transmit ports corresponding to different antennas. The antennas can be dual-polarized (e.g., supporting polarization multiple input multiple output (MIMO)) or independent (e.g., supporting spatial MIMO). As used herein, "layer" may refer to a data stream. Different layers may be precoded and/or encoded differently. Different layers (e.g., before precoding) may correspond to different streams of data (e.g., after precoding). For example, a UE may be enabled to transmit multiple streams of data using multiple layers and/or multiple beams. In some cases, a layer may be referred to as a MIMO layer. MIMO may enable a UE to communicate using multiple layers (e.g., 2, 3, 4, 8 and/or a different quantity of layers), thereby increasing a throughput for the UE and increasing a capacity of the wireless network. In some aspects, multiple layers (e.g., multiple independently encoded data streams) may be transmitted by a UE in single input single output (SISO) scenarios. At a receiver, layers may be independently demodulated and/or decoded. For example, a receiver may demodulate and/or decode a multiple layer signal layer-by-layer.

A receiving UE may receive and/or decode the first layer (e.g., associated with sidelink control information and/or the PSCCH). For example, the receiving UE may receive and/or decode the first layer in a similar manner as if only a single layer were transmitted by the UE. The receiving UE may identify whether sidelink data or other information included in the second layer is intended for the receiving UE based at least in part on the sidelink control information included in the first layer. If the receiving UE identifies that sidelink data or other information included in the second layer is intended for the receiving UE, then the receiving UE may decode the second layer. For example, the receiving UE may apply successive interference cancellation (SIC) (e.g., based at least in part on the insertion loss) to remove the first layer from the received signal to enable the receiving UE to decode the second layer.

As indicated above, FIG. 6 is provided as an example. Other examples may differ from what is described with respect to FIG. 6.

FIGS. 7A-7D are diagrams illustrating an example 700 associated with SCM for sidelink communications, in accordance with the present disclosure. As shown in FIGS. 7A-7D, example 700 includes communication between a base station 110, a first UE 705 (e.g., a UE 120), and a second UE 710 (e.g., a UE 120). In some aspects, the base station 110, the first UE 705, and the second UE 710 may be included in a wireless network, such as the wireless network 100. The base station 110 may communicate with the first UE 705 and/or the second UE 710 via a wireless access link, which may include an uplink and a downlink. The first UE 705 and the second UE 710 may communicate via a sidelink (e.g., in a similar manner as described in connection with FIGS. 4 and 5).

As shown by reference number 715, the base station 110 may transmit, and the first UE 705 may receive, an indication to apply SCM for one or more sidelink communications. For example, in a transmission Mode 1 (e.g., described above in connection with FIG. 4), the base station 110 may perform resource selection and/or scheduling for sidelink communications. The base station 110 may transmit, to the first UE 705, a grant for a sidelink communication (e.g., a sidelink data communication). The grant may be a dynamic grant (e.g., indicated by DCI) or a configured grant (e.g., indicated at least partially by an RRC message). The grant may indicate that the first UE 705 is to apply SCM to sidelink communications transmitted using the grant (e.g., as described herein). In some aspects, the grant may indicate an insertion loss to be applied by the first UE 705. As described elsewhere herein, the insertion loss may be a difference in transmission power levels between a first layer and a second layer transmitted by the first UE 705. In some aspects, the grant may indicate an identifier of a set of REs associated with the second layer described herein (e.g., a layer associated with sidelink data and/or the PSSCH). For example, the grant may indicate an index associated with the set of REs. The index may identify a set of REs that have been configured, pre-configured, and/or hardcoded for the first UE 120.

For example, the first UE 705 (and/or the second UE 710) may receive configuration information (e.g., from the base station 110, a roadside unit, another UE, and/or another device). The configuration information may indicate one or more sets of REs associated with sidelink control information and/or the PSCCH. Additionally, or alternatively, the configuration information may indicate one or more sets of REs associated with sidelink data and/or the PSSCH. As used herein, a set of REs associated with sidelink control information and/or the PSCCH may be referred to as a "base set of REs." Similarly, a layer associated with sidelink control information and/or the PSCCH may be referred to as a "base layer." A set of REs associated with sidelink data and/or the PSSCH may be referred to as an "enhancement set of REs." A layer associated with sidelink data and/or the PSSCH may be referred to as an "enhancement layer."

The configuration information may configure one or more base sets of REs and/or one or more enhancement sets of REs for each resource pool (e.g., each resource pool configured for the first UE 705 and/or the second UE 710). For example, one or more sidelink channels may use resource pools for selecting and/or scheduling sidelink communications (e.g., as described above in connection with FIG. 4). The configuration information may indicate one or more base sets of REs and/or one or more enhancement sets of REs per resource pool (e.g., for each resource pool). For example, the one or more base sets of REs and/or one or more enhancement sets of REs may be configured in a Layer 3 of the first UE 705 and/or the second UE 710. "Layer 3" may refer to a protocol stack layer of a UE. Layer 3 may also be referred to as an "RRC layer." The configuration information that indicates the one or more base sets of REs and/or one or more enhancement sets of REs may be, or may include, a resource pool configuration. For example, a resource pool configuration for a given resource pool may indicate one or more base sets of REs and/or one or more enhancement sets of REs associated with the given resource pool. The configuration information may be received by the first UE 705 and/or the second UE 710 via RRC signaling. As another example, the configuration information may be received by the first UE 705 and/or the second UE 710 via a system information block (SIB) message.

In some aspects, one or more base sets of REs may be pre-configured or hardcoded on the first UE 705 and/or the second UE 710. For example, one or more base sets of REs may be defined, or otherwise fixed, by a wireless communication standard, such as the 3GPP. In such examples, the base sets of REs may not be signaled to the first UE 705 and/or the second UE 710 via configuration information. In some aspects, one or more enhancement sets of REs (e.g., a second set of REs that are associated with sidelink data and/or the PSSCH) may be pre-configured or hardcoded on the first UE 705 and/or the second UE 710. For example, one or more enhancement sets of REs may be defined, or otherwise fixed, by a wireless communication standard, such as the 3GPP. In such examples, the enhancement sets of REs may not be signaled to the first UE 705 and/or the second UE 710 via configuration information.

In some aspects, a base set of REs (e.g., a first set of REs associated with sidelink control information and/or the PSCCH) may include all REs within a given slot or a given mini-slot. Alternatively, a base set of REs may include a subset of REs of a set of REs within a given slot or a given mini-slot. For example, a base set of REs may include REs associated with each OFDM symbol associated with a slot or a mini-slot (e.g., in the time domain) and may include REs associated with a subset of subcarriers associated with the slot or the mini-slot (e.g., in the frequency domain). As another example, a base set of REs may include REs associated with a subset of OFDM symbols associated with a slot or a mini-slot (e.g., in the time domain) and may include REs associated with each subcarrier associated with the slot or the mini-slot (e.g., in the frequency domain). As another example, a base set of REs may include REs associated with a subset of OFDM symbols associated with a slot or a mini-slot (e.g., in the time domain) and may include REs associated with a subset of subcarriers associated with the slot or the mini-slot (e.g., in the frequency domain).

In some aspects, one or more base sets of REs (e.g., associated with sidelink control information and/or the PSCCH) may be activated for a given resource pool. For example, an identifier for each of the one or more base sets of REs may be indicated (e.g., in a Layer 3 message, an RRC message, and/or a SIB message) to the first UE 705 and/or the second UE 710 to activate the one or more base sets of REs for the given resource pool. If two or more base sets of REs are activated for a given resource pool, then a receiving UE (e.g., the second UE 710 in the example 700) may perform multiple hypothesis blind decoding to decode a base layer (e.g., to identify which base set of REs, from the two or more base sets of REs, was used by a transmitting UE).

In some aspects, one or more enhancement sets of REs may be configured, pre-configured, or defined for each resource pool. In some aspects, one or more enhancement sets of REs may be configured, pre-configured, or defined for a sidelink (e.g., the sidelink between the first UE 705 and the second UE 710) rather than being configured, pre-configured, or defined for each resource pool associated with the sidelink. In some aspects, at least one enhancement set of REs may be defined or configured that includes all REs within a given slot or a given mini-slot. In some aspects, a default enhancement set of REs may be indicated for the first UE 705 and/or the second UE 710 for each resource pool. The default enhancement set of REs may be a set of REs that are to be used by a UE to transmit an enhancement layer (e.g., associated with sidelink data and/or the PSSCH) when using a given resource pool (e.g., absent other signaling or indications to use a different enhancement set of REs). In some aspects, multiple enhancement sets of REs may be configured for the first UE 705 and/or the second UE 710 (e.g., in the Layer 3). In such examples, the first UE 705 and/or the second UE 710 may receive a dynamic indication (e.g., a Layer 1 dynamic indication or a physical (PHY) Layer indication) that an enhancement set of REs are to be used for a given sidelink communication. For example, the dynamic indication may be transmitted by the first UE 705 to the second UE 710 via a base layer associated with an enhancement layer (e.g., the base layer may include the dynamic indication of the enhancement set of REs that are used for the enhancement layer).

In some aspects, the first UE 705 and the second UE 710 may communicate to establish one or more sets of REs for sidelink data messages (e.g., one or more enhancement sets of REs) associated with a resource pool between the first UE 705 and the second UE 710. For example, the first UE 705 and the second UE 710 may communicate to establish an enhancement set of REs that is to be used (e.g., for a given resource pool) for sidelink data communications between the first UE 705 and the second UE 710. As another example, the first UE 705 and the second UE 710 may communicate to establish multiple enhancement sets of REs that may be used (e.g., for a given resource pool) for sidelink data communications between the first UE 705 and the second UE 710. In such examples, a dynamic indication may be used to indicate an enhancement set of REs, from the multiple enhancement sets of REs, that is used for a given sidelink communication (e.g., in a similar manner as described elsewhere herein). In other words, the first UE 705 and the second UE 710 may communicate to override an enhancement set of REs (e.g., to use a different enhancement set of REs) that is configured, pre-configured, or defined for a given resource pool.

As shown by reference number 720, the first UE 705 may encode, for a first set of REs (e.g., a base set of REs), a first layer for sidelink control information. For example, the first UE 705 may encode the first set of REs and/or the first layer to include sidelink control information. In some aspects, the first UE 705 may encode the first layer to include SCI-1 information. In some other aspects, the first UE 705 may encode the first layer to include SCI-1 information and SCI-2 information. For example, the first UE 705 may identify a first set of REs (e.g., a base set of REs) to be used for the sidelink control information and/or a first layer (e.g., a base layer). In some aspects, the first UE 705 may identify the first set of REs based at least in part on configuration information (e.g., resource pool configuration information). For example, the first UE 705 may identify the first set of REs based at least in part on a resource pool associated with transmitting the sidelink control information (e.g., the first set of REs may be configured for, or defined for, the resource pool). In some aspects, the first UE 705 may encode the first set of REs using quadrature phase shift keying (QPSK) modulation.

As shown by reference number 725, the first UE 705 may encode, for a second set of REs (e.g., an enhancement set of REs), a second layer for sidelink data. For example, the first UE 705 may encode the second layer (e.g., the second set of REs) with sidelink data (e.g., to include the sidelink data). In some aspects, the first UE 705 may encode the second layer to include SCI-2 information. The first UE 705 may identify the second set of REs (e.g., the enhancement set of REs) to be used for the sidelink data and/or the second layer (e.g., the enhancement layer). In some aspects, the first UE 705 may identify the second set of REs based at least in part on configuration information (e.g., resource pool configuration information). For example, the first UE 705 may identify the second set of REs based at least in part on a resource pool associated with transmitting the sidelink data (e.g., the second set of REs may be configured for, or defined for, the resource pool). In some aspects, the first UE 705 may encode the second set of REs using QPSK modulation.

The first set of REs (e.g., the base set of REs) and the second set of REs (e.g., the enhancement set of REs) may be associated with the same one or more symbols. For example, the first set of REs and the second set of REs may be associated with the same slot or the same mini-slot. In other words, the first layer (and/or the first set of REs) and the second layer (and/or the second set of REs) may be transmitted by the first UE 705 at least partially at the same time. The first UE 705 may encode the first layer (and/or the first set of REs) and may encode the second layer (and/or the second set of REs) independently and/or separately. For example, the first UE 705 may encode the first layer (and/or the first set of REs) with the sidelink control information. The first UE 705 may encode the second layer (and/or the second set of REs) with the sidelink data.

Figure 7A:
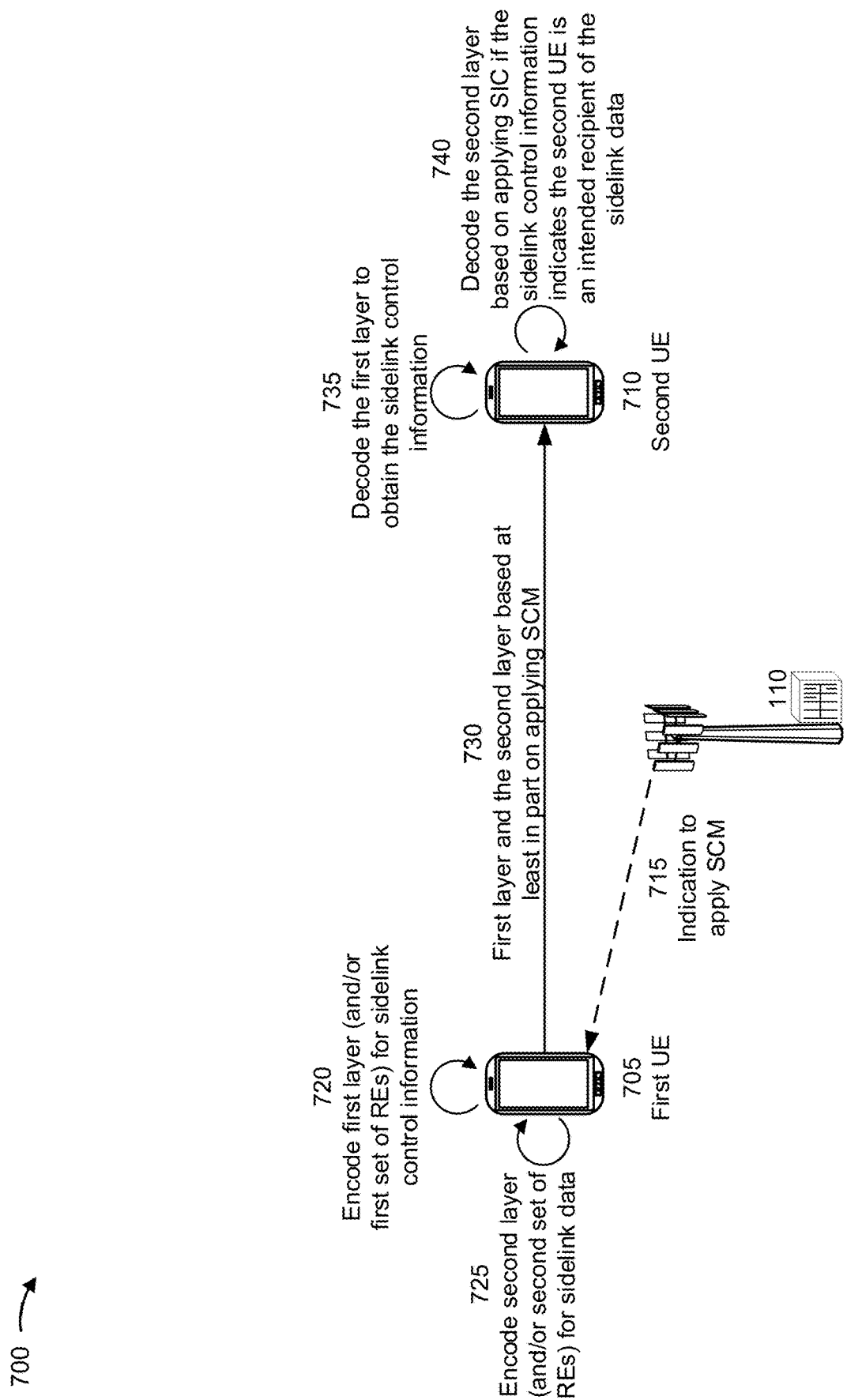
FIGS. 7A-7D are diagrams illustrating an example associated with superposition coded modulation (SCM) for sidelink communications, in accordance with the present disclosure.
Figure 7B:
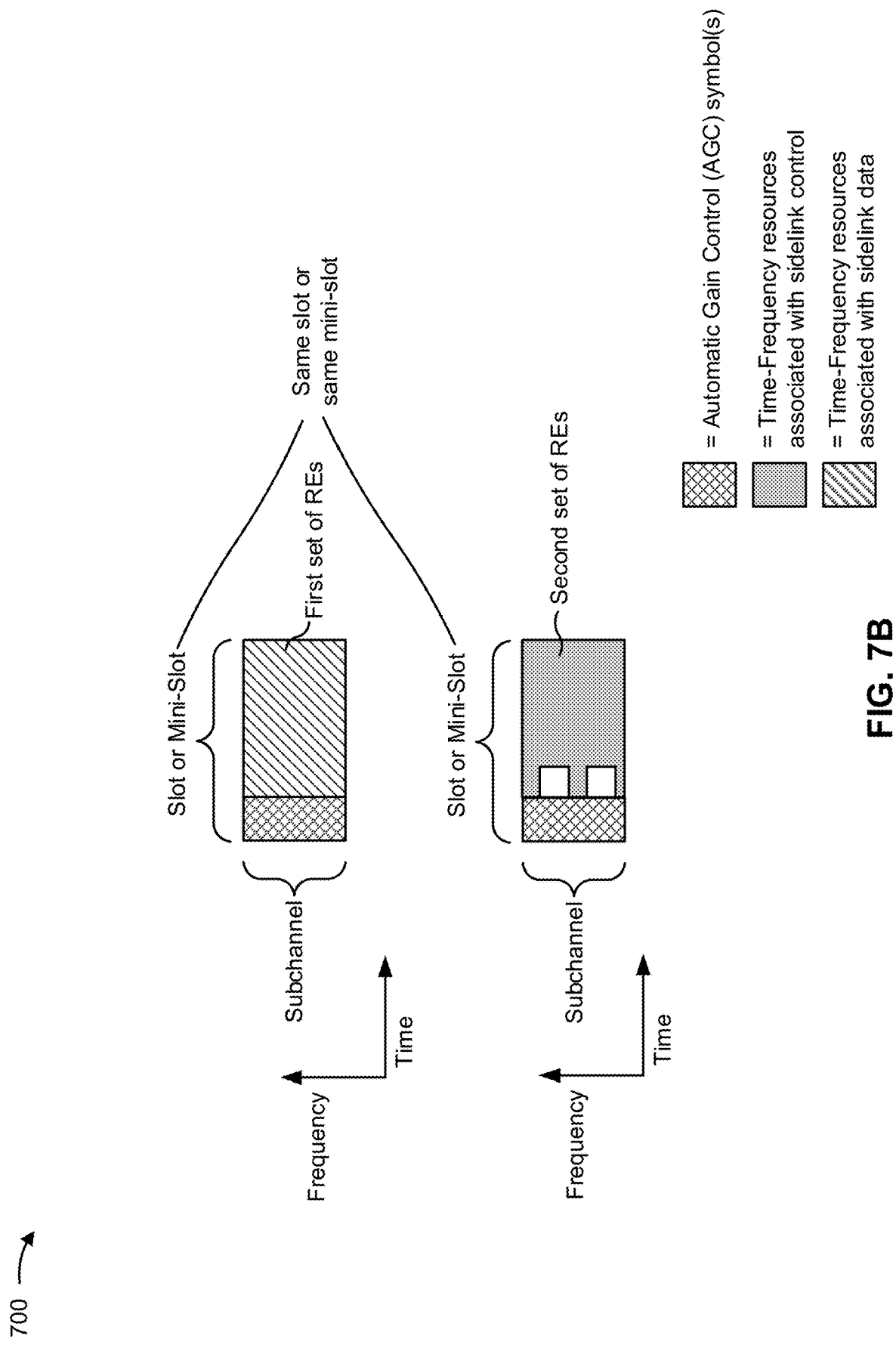

As shown in FIG. 7B, the first set of REs (e.g., associated with sidelink control information) and the second set of REs (e.g., associated with sidelink data) may be associated with the same slot or the same mini-slot. In the example shown in FIG. 7B, the first set of REs may occupy all REs of the slot or the mini-slot (e.g., all REs that are available for sidelink communications). The second set of REs may occupy less than all REs of the slot or the mini-slot. For example, there may be some REs that are included in the first set of REs that are not included in the second set of REs. In other words, the second set of REs may be a subset of REs of the first set of REs. In some other aspects, the first set of REs and the second set of REs may be the same set of REs.

The first UE 705 may use hierarchal modulation, such as MUST, to jointly carry information associated with the first layer and information associated with the second layer on the same RE (e.g., on an RE that is included in the first set of REs and the second set of REs). For example, the first UE 705 may modulate, on the same RE, sidelink control information and sidelink data using MUST or another hierarchal modulation technique. In this way, information associated with the first layer and information associated with the second layer may be carried by the same RE. This may improve the spectral efficiency of sidelink communications.

In some aspects, the first set of REs may include one or more pilot REs that are associated with carrying a DMRS sequence for the sidelink control information. A DMRS may carry information used to estimate a radio channel for demodulation of an associated physical channel. For example, a DMRS sequence may be defined, or indicated, for the first layer, the sidelink control information, and/or the PSCCH. The first UE 705 may encode the one or more pilot REs to indicate or include the DMRS sequence. By including the DMRS sequence in the one or more pilot REs, a decoding performance of the first set of REs and/or the first layer may be improved because the second UE 710 may be enabled to receive and/or decode the DMRS sequence via the one or more pilot REs.

In some aspects, the second set of REs may include one or more pilot REs that are associated with carrying a DMRS sequence for the sidelink data and/or the PSSCH. For example, a DMRS sequence may be defined, or indicated, for the sidelink data and/or the PSSCH. In some aspects, the DMRS sequence may be based at least in part on a cyclic redundancy check (CRC) associated with the information carried by the first layer and/or the first set of REs. For example, the DMRS sequence associated with the second layer may be based at least in part on a CRC associated with the first layer, the first set of REs, and/or the PSCCH. The one or more pilot REs included in the second set of REs may be the same REs as the one or more pilot REs included in the first set of REs that are associated with carrying the DMRS sequence for the sidelink control information and/or the PSCCH. In such examples, the first UE 705 may apply hierarchal modulation, such as MUST, to multiplex a first DMRS sequence (e.g., associated with the first set of REs) and a second DMRS sequence (e.g., associated with the second set of REs) on the same RE (e.g., on the same pilot RE).

In some other aspects, the one or more pilot REs included in the second set of REs may be different than the one or more pilot REs included in the first set of REs that are associated with carrying the DMRS sequence for the sidelink control information and/or the PSCCH. For example, the one or more pilot REs included in the second set of REs may include a different number of REs and/or differently located (e.g., in the time domain and/or frequency domain) REs than the one or more pilot REs included in the first set of REs. For example, an MCS used for the first layer may be different than an MCS used for the second layer. For example, the first UE 705 may use a higher order MCS for the second layer to improve decoding performance and/or channel estimation performance associated with the second layer. In such examples, the first UE 705 may apply hierarchal modulation, such as MUST, to multiplex a first DMRS sequence with information (e.g., sidelink control information or sidelink data) on the same RE. For example, a pilot RE associated with the first set of REs may be the same RE as an RE included in the second set of REs that carries sidelink data. Therefore, the first UE 705 may apply hierarchal modulation, such as MUST, to multiplex a first DMRS sequence with the data on the RE.

In some cases, SCM may result in degraded channel estimation of one (or all) of the layers transmitted by the first UE 705 (e.g., because there is super-positioned information for different layers on the same RE(s), resulting in potential interference). Therefore, in some aspects, the first set of REs (e.g., the base set of REs associated with sidelink control information) may include one or more non-SCM REs. A non-SCM RE may be an RE in which no information is included. For example, in a non-SCM RE, only one layer may be transmitted. For example, in the one or more non-SCM REs included in the first set of REs, only information associated with the second layer may be transmitted (e.g., no information associated with the first layer may be included in the one or more non-SCM REs included in the first set of REs). The one or more non-SCM REs included in the first set of REs may be the one or more pilot REs included in the second set of REs associated with carrying a DMRS sequence for the sidelink data and/or the PSSCH. In other words, the first layer may not include sidelink control information in REs that are associated with transmitting the DMRS sequence in the second layer. In this way, only the DMRS sequence for the sidelink data and/or the PSSCH may be transmitted using the non-SCM REs (e.g., and no information associated with the first layer may be transmitted using the non-SCM REs). This may improve channel estimation for the second layer because an ability of the second UE 710 to receive and decode the DMRS sequence may be improved. Improving the channel estimation for the second layer may result in improved SIC for the second layer. Improving the SIC may improve the ability of the second UE 710 to receive and decode the second layer, thereby improving a reliability of the sidelink data transmitted via the second layer.

In some aspects, the second set of REs (e.g., associated with the sidelink data and/or the PSSCH) may include one or more non-SCM REs. For example, the second set of REs may include one or more REs in which no sidelink data is included or transmitted. The one or more non-SCM REs included in the second set of REs may be the one or more pilot REs included in the first set of REs (e.g., that carry the DMRS sequence associated with the first layer). In other words, the second layer may not include sidelink data in REs that are associated with transmitting the DMRS sequence in the first layer. In this way, only the DMRS sequence for the sidelink control information and/or the PSCCH may be transmitted using the non-SCM REs (e.g., and no information associated with the second layer may be transmitted using the non-SCM REs). This may improve channel estimation for the first layer because an ability of the second UE 710 to receive and decode the DMRS sequence may be improved (e.g., due to a reduced likelihood of interference from the second layer). For example, the first layer and the second layer may be transmitted using different antenna ports and/or different precoders. As a result, it may be difficult for the second UE 710 to estimate a channel associated with the first layer when the first layer and the second layer are modulated using SCM. Improving the channel estimation for the first layer may result improved SIC for the second layer. Improving the SIC may improve the ability of the second UE 710 to receive and decode the second layer, thereby improving a reliability of the sidelink data transmitted via the second layer. Additionally, the first UE 705 may be enabled to apply a power boost (e.g., to transmit with a higher transmit power level) to the one or more pilot REs included in the first set of REs because of the one or more non-SCM REs included in the second set of REs (e.g., when the first layer is modulated using QPSK modulation). Applying the power boost may improve the reliability of the DMRS sequence transmitted using the one or more pilot REs included in the first set of REs.

In some aspects, the first set of REs (e.g., associated with the first layer, sidelink control information, and/or the PSCCH) may include one or more non-SCM REs (e.g., one or more REs that do not have SCM applied). In some aspects, the second set of REs may include one or more REs that are not included in the first set of REs. In other words, there may be some REs that are associated with the second layer and/or the sidelink data (e.g., and not associated with the first layer and/or the sidelink control information). The first UE 705 may use the REs (e.g., the one or more non-SCM REs and/or the REs included in the second set of REs that are not included in the first set of REs) for one or more operations. For example, the first UE 705 may use the REs to transmit a sidelink CSI reference signal (S-CSI-RS). As another example, the REs may use a different modulation scheme (e.g., a different MCS) for the sidelink data than a modulation scheme used for the remainder of the second set of REs. As another example, the REs may use a different rate-matching value than a rate matching value used for the second set of REs. For example, using a different MCS and/or different rate-matching may improve a reliability and/or efficiency of information transmitted using the REs. In some aspects, the first UE 705 may use the REs to transmit an SCI-2 message in the second layer. This may improve a reliability and/or an efficiency associated with the SCI-2 message.

Figure 7C:
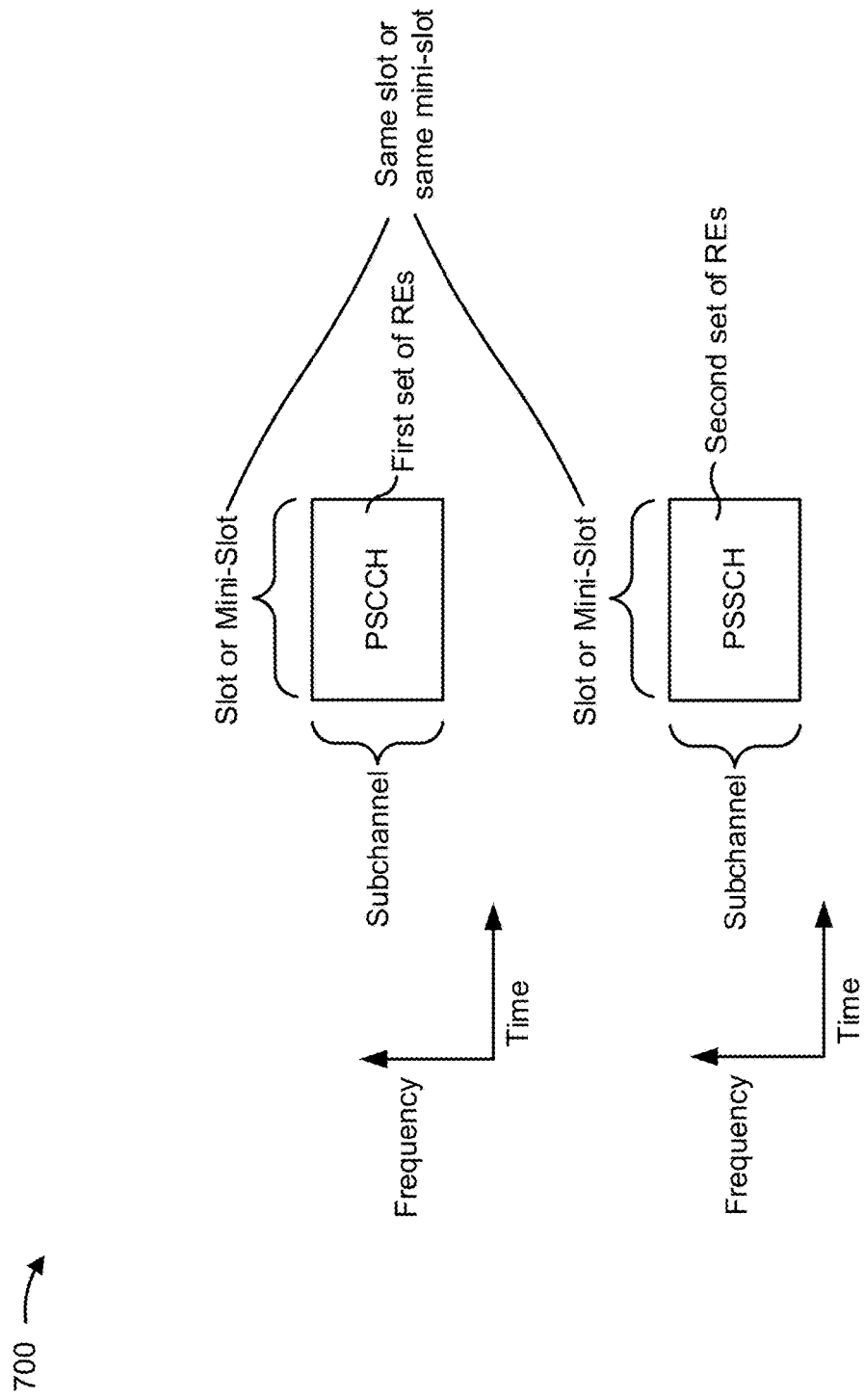

As shown in FIG. 7C, the first layer and/or the first set of REs may carry PSCCH information and the second layer and/or the second set of REs may carry PSSCH information. For example, the first set of REs may be associated with the PSCCH and the second set of REs may be associated with the PSSCH. In this way, PSSCH information and PSCCH information are not limited to a subset or a portion of the time-frequency resources of the slot or the mini-slot. Rather, in some cases, the PSCCH information and the PSSCH information may occupy all REs (e.g., in the slot or the mini-slot) that are available for sidelink transmissions. This may improve a spectral efficiency and a capacity of sidelink communications. In some aspects, the PSCCH information (e.g., the sidelink control information) may include an insertion loss associated with a transmit power level of the sidelink data, and/or an identifier (e.g., an index value) associated with the second set of REs, among other examples. For example, the first UE 705 may include an indication of an insertion loss and/or an index associated with the second set of REs in the PSCCH information carried by the first set of REs (e.g., in the first layer).

Figure 7D:
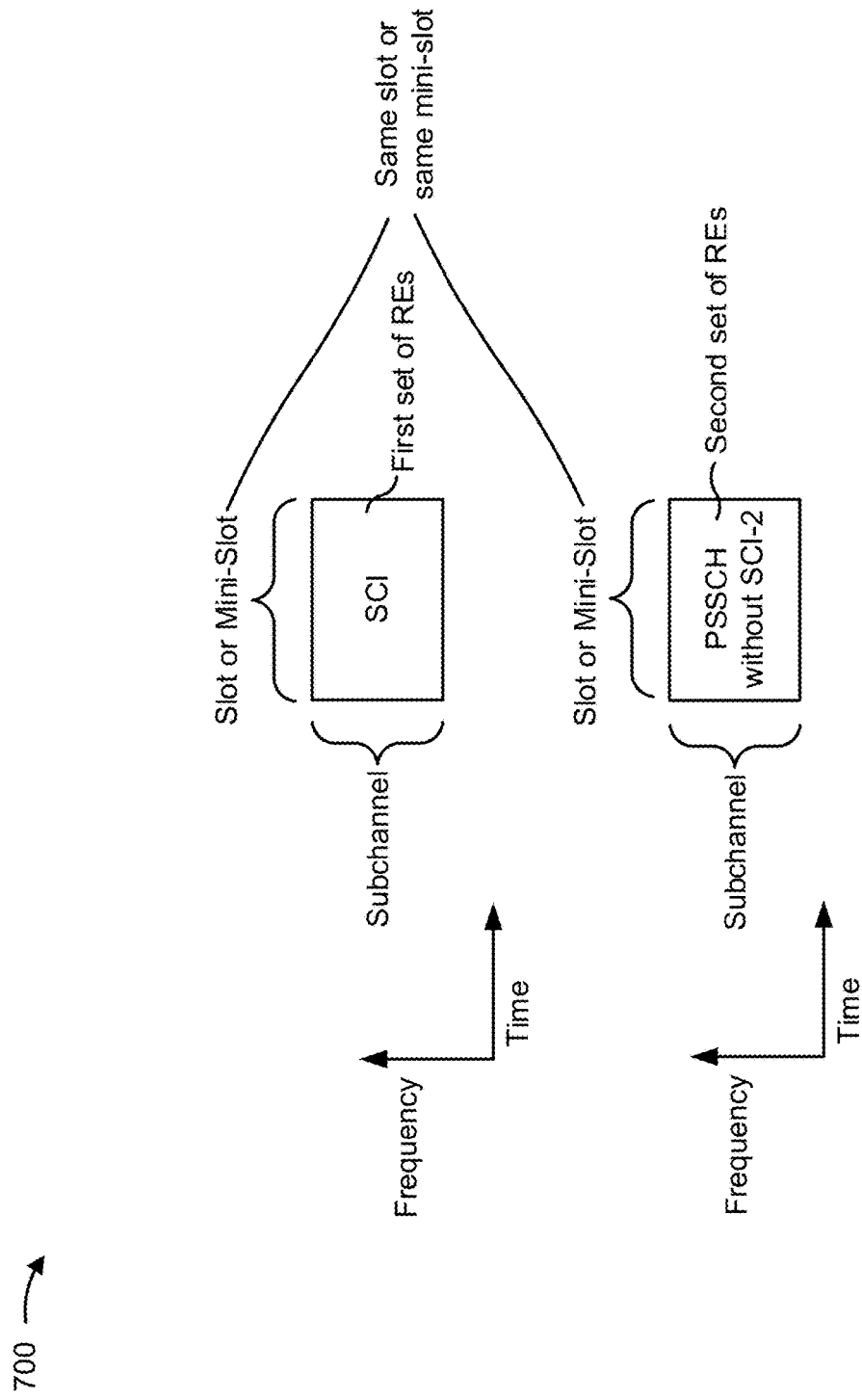

In some aspects, as shown in FIG. 7D, the first layer and/or the first set of REs may carry SCI and the second layer and/or the second set of REs may carry PSSCH information (e.g., without SCI-2 information). In some other aspects, SCI-2 information may be included in the second layer. For example, the first layer may include SCI and the second layer may not include SCI. In some aspects, the SCI included in the first layer may be a one-stage SCI. For example, the one-stage SCI may include some (or all) information indicated by SCI-1 and SCI-2 (e.g., as described in connection with FIG. 4). In some other aspects, the SCI included in the first layer may be a two-stage SCI (e.g., may include SCI-1 and SCI-2). For example, a DMRS associated with the first layer may be used (e.g., by the second UE 710) to demodulate and/or decode the SCI-2. The SCI-2 may include an indication of an insertion loss associated with a transmit power level of the sidelink data (and/or the second layer) and/or an identifier (e.g., an index value) associated with the second set of REs, among other examples.

Returning to FIG. 7A, as shown by reference number 730, the first UE 705 may transmit, and the second UE 710 may receive, the sidelink control information using the first set of REs and the sidelink data using the second set of REs. For example, the first UE 705 may apply SCM (e.g., may modulate using SCM) to the first layer and the second layer. The first UE 705 may transmit, and the second UE 710 may receive, the first set of REs (e.g., in the first layer) and the second set of REs (e.g., in the second layer). For example, the first UE 705 may transmit a signal that includes the first layer and the second layer. In some aspects, the first UE 705 may transmit the first layer using a first antenna port, a first antenna array, and/or a first antenna element. The first UE 705 may transmit the second layer using a second antenna port, a second antenna array, and/or a second antenna element.

In some aspects, the first UE 705 may transmit the first layer and/or the sidelink control information using a first transmit power level. The first UE 705 may transmit the second layer and/or the sidelink data using a second transmit power level. The first transmit power level may be greater than the second transmit power level. For example, the first transmit power level may be greater than the second transmit power level by the value of the insertion loss. Transmitting the first layer and the second layer using different transmit power levels may enable a UE (e.g., the second UE 710) to receive and decode both the first layer and the second layer (e.g., by applying SIC to remove the first layer from a received signal). As described elsewhere herein, the first set of REs and/or the first layer may carry a first DMRS sequence associated with the first layer and/or the PSCCH. The second set of REs and/or the second layer may carry a second DMRS sequence associated with the second layer and/or the PSSCH. In some aspects, the first layer and/or the sidelink control information may include an indication of the insertion loss and/or an indication of the second set of REs (e.g., to enable the second UE 710 to identify, receive, and/or decode the second layer).

In some aspects, the first UE 705 may transmit the first layer and the second layer using a mini-slot format (e.g., the first layer and the second layer may be included in a mini-slot). By applying SCM and transmitting the sidelink control information and the sidelink data in different layers (e.g., as described herein), a spectral efficiency associated with the mini-slot format may be increased because the sidelink control information and the sidelink data may occupy a greater portion of REs included in a mini-slot. For example, both the sidelink control information and the sidelink data may occupy up to all REs in a mini-slot (or a slot) that are available for sidelink communications. This improves the spectral efficiency associated with the sidelink communications (e.g., as compared to a sidelink format in which sidelink control information and sidelink data are limited to a portion or a subset of time-frequency resources in a slot or mini-slot, such as depicted and described in connection with FIG. 6). In some aspects, the first UE 705 may transmit the sidelink control information in a PSCCH message. In other words, the first layer may include the PSCCH message. The first UE 705 may transmit the sidelink data in a PSSCH message. In other words, the second layer may include a PSSCH message.

As shown by reference number 735, the second UE 710 may decode the first set of REs and/or the first layer to obtain information included in the sidelink control information (e.g., to obtain information carried by the first set of REs and/or the first layer). For example, the second UE 710 may obtain the sidelink control information carried by the first layer and may identify whether sidelink data (e.g., included in the second layer) is intended for the second UE 710. For example, the sidelink control information may include an indication of one or more intended UEs for the sidelink data carried by the second layer. If the second UE 710 identifies that the second UE 710 is an intended recipient of the sidelink data (e.g., included in the second layer), then the second UE 710 may identify information associated with the second layer based at least in part on the sidelink control information. For example, the second UE 710 may identify an insertion loss (e.g., a difference in transmit power levels between the first layer and the second layer). Additionally, or alternatively, the second UE 710 may identify the second set of REs based at least in part on an identifier of the second set of REs included in the sidelink control information.

Based at least in part on the information associated with the second layer, the second UE 710 may perform SIC to the first set of REs. For example, the second UE 710 may perform channel estimation for the first layer and/or the first set of REs by receiving and/or measuring the DMRS sequence carried by the first layer and/or the first set of REs. The second UE 710 may use the identified insertion loss and the channel estimation of the first layer to remove the first layer from the signal received by the second UE 710. The second UE 710 may perform SIC based at least in part on the identified insertion loss and the channel estimation of the first layer. This may enable the second UE 710 to decode the second layer and/or the second set of REs.

As shown by reference number 740, the second UE 710 may decode the second set of REs and/or the second layer to obtain information included in the sidelink data. For example, the second UE 710 may decode the second set of REs and/or the second layer based at least in part on decoding the first set of REs and/or the first layer. The second UE 710 may decode the second set of REs based at least in part on performing SIC to the signal received by the second UE 710, as described above. As a result, the second UE 710 may be enabled to obtain sidelink control information (e.g., from the first layer and/or the first set of REs) and sidelink data (e.g., from the second layer and/or the second set of REs) in a more efficient manner.

For example, a spectral efficiency and/or a capacity associated with sidelink communication may be improved by applying SCM to sidelink communications, as described herein. For example, time-frequency resources for sidelink control and sidelink data may not be limited to portions or subsets of time-frequency resources or a slot or a mini-slot. Therefore, the first UE 705 may use an increased capacity to transmit both sidelink control information and sidelink data based at least in part on applying SCM, as described in more detail elsewhere herein. Additionally, applying SCM to sidelink communications may alleviate a signaling overhead associated with sidelink control signaling when mini-slots are used (e.g., because sidelink data may occupy the same REs as the sidelink control information by transmitting the sidelink data and the sidelink control information in different layers). As a result, the UE may be enabled to use mini-slot scheduling for sidelink communications, thereby reducing a latency associated with the sidelink communications.

As indicated above, FIGS. 7A-7D are provided as examples. Other examples may differ from what is described with respect to FIGS. 7A-7D.

Figure 8:
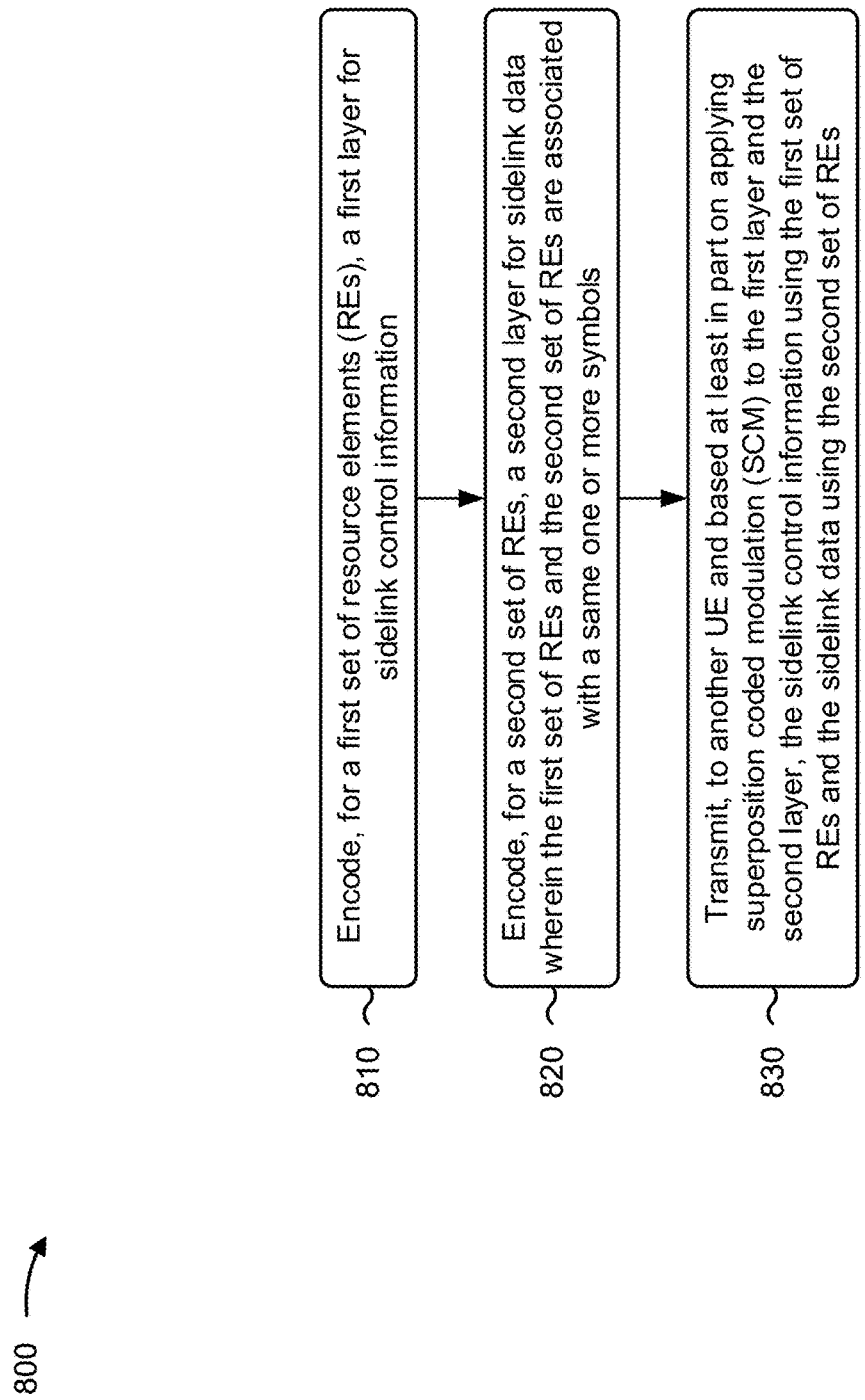
FIGS. 8 and 9 are diagrams illustrating example processes associated with SCM for sidelink communications, in accordance with the present disclosure.

FIG. 8 is a diagram illustrating an example process 800 performed, for example, by a UE, in accordance with the present disclosure. Example process 800 is an example where the UE (e.g., UE 120 and/or the first UE 705) performs operations associated with SCM for sidelink communications.

As shown in FIG. 8, in some aspects, process 800 may include encoding, for a first set of REs, a first layer for sidelink control information (block 810). For example, the UE (e.g., using communication manager 140 and/or encoding component 1008, depicted in FIG. 10) may encode, for a first set of REs, a first layer for sidelink control information, as described above.

As further shown in FIG. 8, in some aspects, process 800 may include encoding, for a second set of REs, a second layer for sidelink data, wherein the first set of REs and the second set of REs are associated with a same one or more symbols (block 820). For example, the UE (e.g., using communication manager 140 and/or encoding component 1008, depicted in FIG. 10) may encode, for a second set of REs, a second layer for sidelink data, wherein the first set of REs and the second set of REs are associated with a same one or more symbols, as described above. In some aspects, the first set of REs and the second set of REs are associated with a same one or more symbols.

As further shown in FIG. 8, in some aspects, process 800 may include transmitting, to another UE and based at least in part on applying SCM to the first layer and the second layer, the sidelink control information using the first set of REs and the sidelink data using the second set of REs (block 830). For example, the UE (e.g., using communication manager 140 and/or transmission component 1004, depicted in FIG. 10) may transmit, to another UE and based at least in part on applying SCM to the first layer and the second layer, the sidelink control information using the first set of REs and the sidelink data using the second set of REs, as described above.

Process 800 may include additional aspects, such as any single aspect or any combination of aspects described below and/or in connection with one or more other processes described elsewhere herein.

In a first aspect, transmitting the sidelink control information using the first set of REs and the sidelink data using the second set of REs includes transmitting the sidelink control information using a first transmit power level, and transmitting the sidelink data using a second transmit power level.

In a second aspect, alone or in combination with the first aspect, the first transmit power level is greater than the second transmit power level.

In a third aspect, alone or in combination with one or more of the first and second aspects, the second set of REs are a subset of REs of the first set of REs.

In a fourth aspect, alone or in combination with one or more of the first through third aspects, the first set of REs and the second set of REs are a same set of REs.

In a fifth aspect, alone or in combination with one or more of the first through fourth aspects, the first set of REs are configured for a resource pool associated with the sidelink control information.

In a sixth aspect, alone or in combination with one or more of the first through fifth aspects, the first set of REs are defined, for a resource pool, by a wireless communication standard.

In a seventh aspect, alone or in combination with one or more of the first through sixth aspects, process 800 includes receiving configuration information indicating the first set of REs for a resource pool associated with the sidelink control information.

In an eighth aspect, alone or in combination with one or more of the first through seventh aspects, the configuration information is received via at least one of a SIB message or an RRC message.

In a ninth aspect, alone or in combination with one or more of the first through eighth aspects, the first set of REs include all REs in a slot or a mini-slot associated with the sidelink control information.

In a tenth aspect, alone or in combination with one or more of the first through ninth aspects, the first set of REs include a subset of REs of a set of REs in a slot or a mini-slot associated with the sidelink control information.

In an eleventh aspect, alone or in combination with one or more of the first through tenth aspects, a plurality of sets of REs, including the first set of REs, are activated or configured for sidelink control information messages in a resource pool that is associated with the sidelink control information.

In a twelfth aspect, alone or in combination with one or more of the first through eleventh aspects, the second set of REs are configured for a resource pool associated with the sidelink data or for a sidelink associated with the sidelink data.

In a thirteenth aspect, alone or in combination with one or more of the first through twelfth aspects, the second set of REs are defined, for a resource pool, by a wireless communication standard.

In a fourteenth aspect, alone or in combination with one or more of the first through thirteenth aspects, process 800 includes receiving configuration information indicating the second set of REs for a resource pool associated with the sidelink data.

In a fifteenth aspect, alone or in combination with one or more of the first through fourteenth aspects, a plurality of sets of REs, including the second set of REs, are configured, in a Layer 3, for sidelink data messages for a resource pool, and process 800 includes transmitting a dynamic indication that the second set of REs are to be used for the sidelink data.

In a sixteenth aspect, alone or in combination with one or more of the first through fifteenth aspects, the dynamic indication that the second set of REs are to be used for the sidelink data is included in the sidelink control information.

In a seventeenth aspect, alone or in combination with one or more of the first through sixteenth aspects, process 800 includes communicating, with the other UE, to establish one or more sets of REs, including the second set of REs, for sidelink data messages, associated with a resource pool, between the UE and the other UE.

In an eighteenth aspect, alone or in combination with one or more of the first through seventeenth aspects, the first set of REs include one or more pilot REs that are associated with carrying a DMRS sequence for the sidelink control information.

In a nineteenth aspect, alone or in combination with one or more of the first through eighteenth aspects, the sidelink control information indicates at least one of an insertion loss associated with a transmit power level of the sidelink data, or an identifier associated with the second set of REs.

In a twentieth aspect, alone or in combination with one or more of the first through nineteenth aspects, the first layer includes SCI, and the second layer does not include SCI.

In a twenty-first aspect, alone or in combination with one or more of the first through twentieth aspects, the SCI included in the first layer is a one-stage SCI.

In a twenty-second aspect, alone or in combination with one or more of the first through twenty-first aspects, the SCI included in the first layer is a two-stage SCI, wherein a DMRS associated with the sidelink control information is used to decode an SCI-2 associated with the SCI included in the sidelink control information, and wherein the SCI-2 includes an indication of at least one of an insertion loss associated with a transmit power level of the sidelink data, or an identifier associated with the second set of REs.

In a twenty-third aspect, alone or in combination with one or more of the first through twenty-second aspects, the second set of REs include one or more pilot REs that are associated with carrying a DMRS sequence for the sidelink data.

In a twenty-fourth aspect, alone or in combination with one or more of the first through twenty-third aspects, the one or more pilot REs are a first one or more pilot REs, and wherein the first one or more pilot REs are a same one or more REs as a second one or more pilot REs, included in the first set of REs, that are associated with carrying a DMRS sequence for the sidelink control information.

In a twenty-fifth aspect, alone or in combination with one or more of the first through twenty-fourth aspects, the one or more pilot REs are a first one or more pilot REs, and the first one or more pilot REs are different than a second one or more pilot REs, included in the first set of REs, that are associated with carrying a DMRS sequence for the sidelink control information.

In a twenty-sixth aspect, alone or in combination with one or more of the first through twenty-fifth aspects, the first set of REs include one or more REs that do not have SCM applied, and wherein the one or more REs are associated with carrying a DMRS sequence for the sidelink data.

In a twenty-seventh aspect, alone or in combination with one or more of the first through twenty-sixth aspects, the second set of REs include one or more REs that do not have SCM applied, and the one or more REs are associated with one or more pilot REs, included in the first set of REs, that are associated with carrying a DMRS sequence for the sidelink control information.

In a twenty-eighth aspect, alone or in combination with one or more of the first through twenty-seventh aspects, the first set of REs include one or more REs that do not have SCM applied, and wherein the one or more REs are associated with at least one of a sidelink CSI reference signal included in the sidelink data, a different modulation scheme for the sidelink data than a modulation scheme used for the second set of REs, or a different rate-matching value than a rate matching value used for the second set of REs, or an SCI-2 message.

In a twenty-ninth aspect, alone or in combination with one or more of the first through twenty-eighth aspects, process 800 includes receiving, from a base station, a sidelink grant for at least one of the sidelink control information or the sidelink data, wherein the sidelink grant indicates that SCM is to be applied to the first layer and the second layer.

In a thirtieth aspect, alone or in combination with one or more of the first through twenty-ninth aspects, the sidelink grant indicates at least one of an insertion loss associated with a transmit power level of the sidelink data, or an identifier associated with the second set of REs.

In a thirty-first aspect, alone or in combination with one or more of the first through thirtieth aspects, transmitting the sidelink control information using the first set of REs and the sidelink data using the second set of REs includes transmitting the sidelink control information and the sidelink data using a mini-slot format.

In a thirty-second aspect, alone or in combination with one or more of the first through thirty-first aspects, the sidelink control information is included in a PSCCH message, and wherein the sidelink data is included in a PSSCH message.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
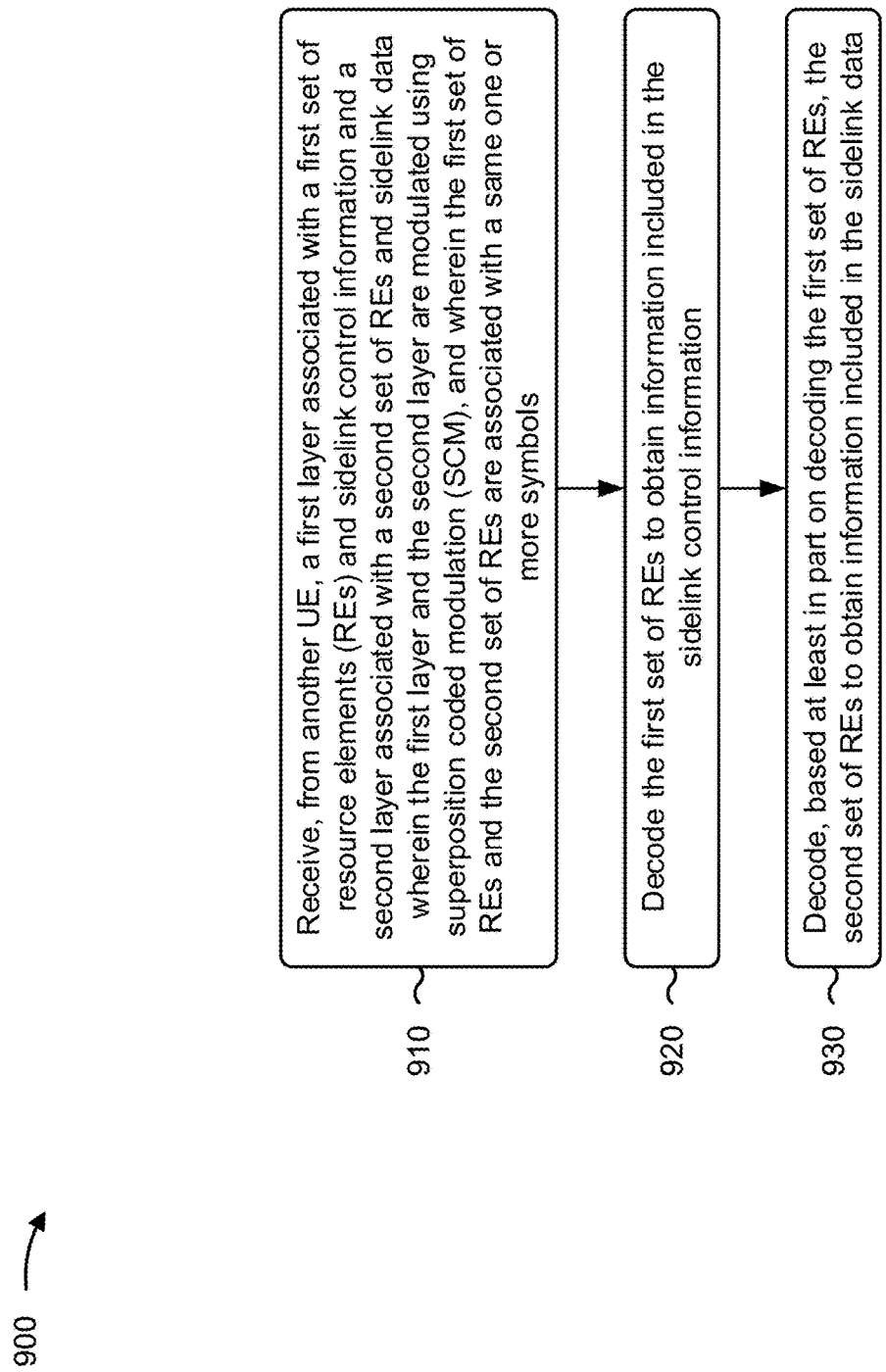

FIG. 9 is a diagram illustrating an example process 900 performed, for example, by a UE, in accordance with the present disclosure. Example process 900 is an example where the UE (e.g., UE 120 and/or the second UE 710) performs operations associated with SCM for sidelink communications.

As shown in FIG. 9, in some aspects, process 900 may include receiving, from another UE, a first layer associated with a first set of REs and sidelink control information and a second layer associated with a second set of REs and sidelink data, wherein the first layer and the second layer are modulated using SCM, and wherein the first set of REs and the second set of REs are associated with a same one or more symbols (block 910). For example, the UE (e.g., using communication manager 140 and/or reception component 1102, depicted in FIG. 11) may receive, from another UE, a first layer associated with a first set of REs and sidelink control information and a second layer associated with a second set of REs and sidelink data, as described above. In some aspects, the first layer and the second layer are modulated using SCM. In some aspects, the first set of REs and the second set of REs are associated with a same one or more symbols.

As further shown in FIG. 9, in some aspects, process 900 may include decoding the first set of REs to obtain information included in the sidelink control information (block 920). For example, the UE (e.g., using communication manager 140 and/or decoding component 1108, depicted in FIG. 11) may decode the first set of REs to obtain information included in the sidelink control information, as described above.

As further shown in FIG. 9, in some aspects, process 900 may include decoding, based at least in part on decoding the first set of REs, the second set of REs to obtain information included in the sidelink data (block 930). For example, the UE (e.g., using communication manager 140 and/or decoding component 1108, depicted in FIG. 11) may decode, based at least in part on decoding the first set of REs, the second set of REs to obtain information included in the sidelink data, as described above.

Process 900 may include additional aspects, such as any single aspect or any combination of aspects described below and/or in connection with one or more other processes described elsewhere herein.

In a first aspect, decoding the second set of REs includes performing SIC to the first set of REs based at least in part on an insertion loss associated with a transmit power level of the sidelink data, and decoding the second set of REs based at least in part on performing SIC to the first set of REs.

In a second aspect, alone or in combination with the first aspect, receiving the first layer and the second layer includes receiving the sidelink control information using a first transmit power level, and receiving the sidelink data using a second transmit power level.

In a third aspect, alone or in combination with one or more of the first and second aspects, the first transmit power level is greater than the second transmit power level.

In a fourth aspect, alone or in combination with one or more of the first through third aspects, the second set of REs are a subset of REs of the first set of REs.

In a fifth aspect, alone or in combination with one or more of the first through fourth aspects, the first set of REs and the second set of REs are a same set of REs.

In a sixth aspect, alone or in combination with one or more of the first through fifth aspects, the first set of REs are configured for a resource pool associated with the sidelink control information.

In a seventh aspect, alone or in combination with one or more of the first through sixth aspects, the first set of REs are defined, for a resource pool, by a wireless communication standard.

In an eighth aspect, alone or in combination with one or more of the first through seventh aspects, process 900 includes receiving configuration information indicating the first set of REs for a resource pool associated with the sidelink control information.

In a ninth aspect, alone or in combination with one or more of the first through eighth aspects, the configuration information is received via at least one of an SIB message or an RRC message.

In a tenth aspect, alone or in combination with one or more of the first through ninth aspects, the first set of REs include all REs in a slot or a mini-slot associated with the sidelink control information.

In an eleventh aspect, alone or in combination with one or more of the first through tenth aspects, the first set of REs include a subset of REs of a set of REs in a slot or a mini-slot associated with the sidelink control information.

In a twelfth aspect, alone or in combination with one or more of the first through eleventh aspects, a plurality of sets of REs, including the first set of REs, are activated or configured for sidelink control information messages in a resource pool that is associated with the sidelink control information.

In a thirteenth aspect, alone or in combination with one or more of the first through twelfth aspects, the second set of REs are configured for a resource pool associated with the sidelink data or for a sidelink associated with the sidelink data.

In a fourteenth aspect, alone or in combination with one or more of the first through thirteenth aspects, the second set of REs are defined, for a resource pool, by a wireless communication standard.

In a fifteenth aspect, alone or in combination with one or more of the first through fourteenth aspects, process 900 includes receiving configuration information indicating the second set of REs for a resource pool associated with the sidelink data.

In a sixteenth aspect, alone or in combination with one or more of the first through fifteenth aspects, a plurality of sets of REs, including the second set of REs, are configured, in a Layer 3, for sidelink data messages for a resource pool, and process 900 includes receiving a dynamic indication that the second set of REs are to be used for the sidelink data.

In a seventeenth aspect, alone or in combination with one or more of the first through sixteenth aspects, the dynamic indication that the second set of REs are to be used for the sidelink data is included in the sidelink control information.

In an eighteenth aspect, alone or in combination with one or more of the first through seventeenth aspects, process 900 includes communicating, with the other UE, to establish one or more sets of REs, including the second set of REs, for sidelink data messages, associated with a resource pool, between the UE and the other UE.

In a nineteenth aspect, alone or in combination with one or more of the first through eighteenth aspects, the first set of REs include one or more pilot REs that are associated with carrying a DMRS sequence for the sidelink control information.

In a twentieth aspect, alone or in combination with one or more of the first through nineteenth aspects, the sidelink control information indicates at least one of an insertion loss associated with a transmit power level of the sidelink data, or an identifier associated with the second set of REs.

In a twenty-first aspect, alone or in combination with one or more of the first through twentieth aspects, the first layer includes SCI, and the second layer does not include SCI.

In a twenty-second aspect, alone or in combination with one or more of the first through twenty-first aspects, the SCI included in the first layer is a one-stage SCI.

In a twenty-third aspect, alone or in combination with one or more of the first through twenty-second aspects, the SCI included in the first layer is a two-stage SCI, wherein a DMRS associated with the sidelink control information is used to decode an SCI-2 associated with the SCI included in the sidelink control information, and the SCI-2 includes an indication of at least one of an insertion loss associated with a transmit power level of the sidelink data, or an identifier associated with the second set of REs.

In a twenty-fourth aspect, alone or in combination with one or more of the first through twenty-third aspects, the second set of REs include one or more pilot REs that are associated with carrying a DMRS sequence for the sidelink data.

In a twenty-fifth aspect, alone or in combination with one or more of the first through twenty-fourth aspects, the one or more pilot REs are a first one or more pilot REs, and the first one or more pilot REs are a same one or more REs as a second one or more pilot REs, included in the first set of REs, that are associated with carrying a DMRS sequence for the sidelink control information.

In a twenty-sixth aspect, alone or in combination with one or more of the first through twenty-fifth aspects, the one or more pilot REs are a first one or more pilot REs, and the first one or more pilot REs are different than a second one or more pilot REs, included in the first set of REs, that are associated with carrying a DMRS sequence for the sidelink control information.

In a twenty-seventh aspect, alone or in combination with one or more of the first through twenty-sixth aspects, the first set of REs include one or more REs that do not have SCM applied, and the one or more REs are associated with carrying a DMRS sequence for the sidelink data.

In a twenty-eighth aspect, alone or in combination with one or more of the first through twenty-seventh aspects, the second set of REs include one or more REs that do not have SCM applied, and the one or more REs are associated with one or more pilot REs, included in the first set of REs, that are associated with carrying a DMRS sequence for the sidelink control information.

In a twenty-ninth aspect, alone or in combination with one or more of the first through twenty-eighth aspects, the first set of REs include one or more REs that do not have SCM applied, and the one or more REs are associated with at least one of a sidelink CSI reference signal included in the sidelink data, a different modulation scheme for the sidelink data than a modulation scheme used for the second set of REs, or a different rate-matching value than a rate matching value used for the second set of REs, or an SCI-2 message.

In a thirtieth aspect, alone or in combination with one or more of the first through twenty-ninth aspects, process 900 includes receiving, from a base station, a sidelink grant for at least one of the sidelink control information or the sidelink data, wherein the sidelink grant indicates that SCM is to be applied to the first layer and the second layer.

In a thirty-first aspect, alone or in combination with one or more of the first through thirtieth aspects, the sidelink grant indicates at least one of an insertion loss associated with a transmit power level of the sidelink data, or an identifier associated with the second set of REs.

In a thirty-second aspect, alone or in combination with one or more of the first through thirty-first aspects, receiving the first layer and the second layer includes receiving the sidelink control information and the sidelink data using a mini-slot format.

In a thirty-third aspect, alone or in combination with one or more of the first through thirty-second aspects, the sidelink control information is included in a PSCCH message, and wherein the sidelink data is included in a PSSCH message.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
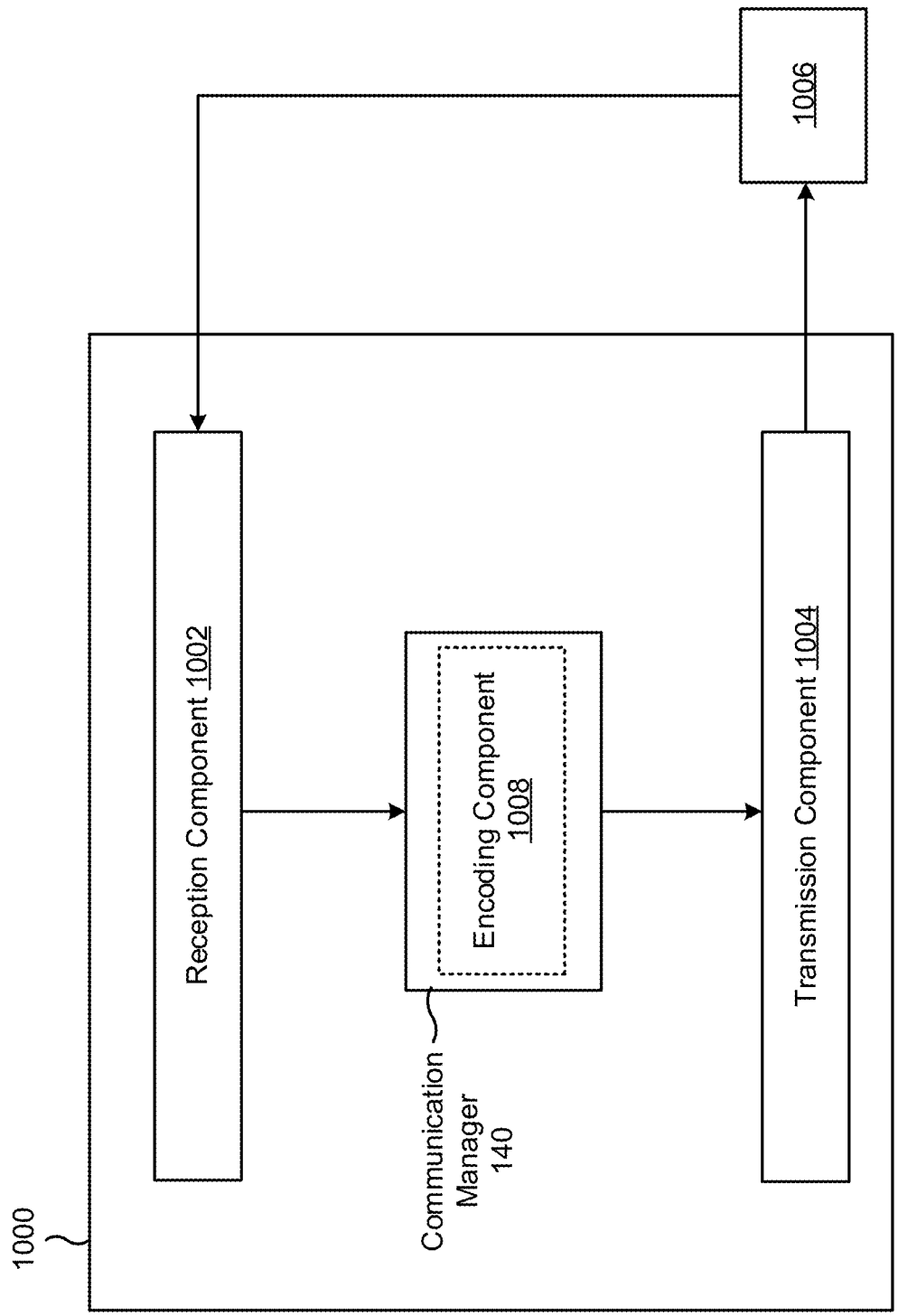
FIGS. 10 and 11 are diagrams of example apparatuses for wireless communication, in accordance with the present disclosure.

FIG. 10 is a diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140. The communication manager 140 may include an encoding component 1008, among other examples.

In some aspects, the apparatus 1000 may be configured to perform one or more operations described herein in connection with FIGS. 7A-7D. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The encoding component 1008 may encode, for a first set of REs, a first layer for sidelink control information. The encoding component 1008 may encode, for a second set of REs, a second layer for sidelink data wherein the first set of REs and the second set of REs are associated with a same one or more symbols. The transmission component 1004 may transmit, to another UE and based at least in part on applying SCM to the first layer and the second layer, the sidelink control information using the first set of REs and the sidelink data using the second set of REs.

The transmission component 1004 may transmit the first layer and/or the sidelink control information using a first transmit power level. The transmission component 1004 may transmit the second layer and/or the sidelink data using a second transmit power level.

The reception component 1002 may receive configuration information indicating the first set of REs for a resource pool associated with the sidelink control information.

The reception component 1002 may receive configuration information indicating the second set of REs for a resource pool associated with the sidelink data.

The reception component 1002 and/or the transmission component 1004 may communicate, with the other UE, to establish one or more sets of REs, including the second set of REs, for sidelink data messages, associated with a resource pool, between the UE and the other UE.

The reception component 1002 may receive, from a base station, a sidelink grant for at least one of the sidelink control information or the sidelink data wherein the sidelink grant indicates that SCM is to be applied to the first layer and the second layer.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
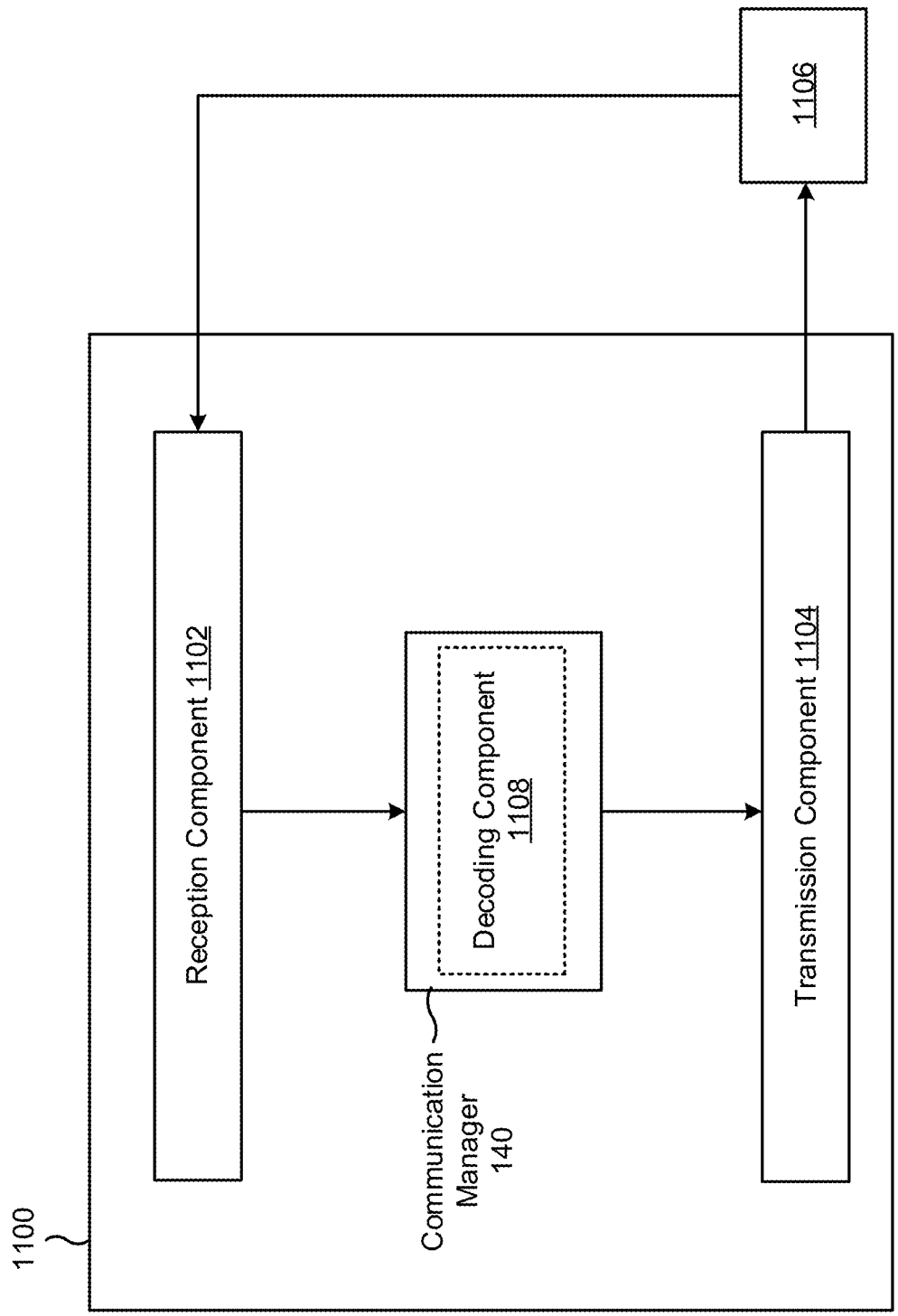

FIG. 11 is a diagram of an example apparatus 1100 for wireless communication. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 140. The communication manager 140 may include a decoding component 1108, among other examples.

In some aspects, the apparatus 1100 may be configured to perform one or more operations described herein in connection with FIGS. 7A-7D. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The reception component 1102 may receive, from another UE, a first layer associated with a first set of REs and sidelink control information and a second layer associated with a second set of REs and sidelink data wherein the first layer and the second layer are modulated using SCM, and wherein the first set of REs and the second set of REs are associated with a same one or more symbols. The decoding component 1108 may decode the first set of REs to obtain information included in the sidelink control information. The decoding component 1108 may decode, based at least in part on decoding the first set of REs, the second set of REs to obtain information included in the sidelink data.

The decoding component 1108 may perform SIC to the first set of REs based at least in part on an insertion loss associated with a transmit power level of the sidelink data.

The reception component 1102 may receive configuration information indicating the first set of REs for a resource pool associated with the sidelink control information.

The reception component 1102 may receive configuration information indicating the second set of REs for a resource pool associated with the sidelink data.

The reception component 1102 and/or the transmission component 1104 may communicate, with the other UE, to establish one or more sets of REs, including the second set of REs, for sidelink data messages, associated with a resource pool, between the UE and the other UE.

The reception component 1102 may receive, from a base station, a sidelink grant for at least one of the sidelink control information or the sidelink data wherein the sidelink grant indicates that SCM is to be applied to the first layer and the second layer.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: encoding, for a first set of resource elements (REs), a first layer for sidelink control information; encoding, for a second set of REs, a second layer for sidelink data, wherein the first set of REs and the second set of REs are associated with a same one or more symbols; and transmitting, to another UE and based at least in part on applying superposition coded modulation (SCM) to the first layer and the second layer, the sidelink control information using the first set of REs and the sidelink data using the second set of REs.

Aspect 2: The method of Aspect 1, wherein transmitting the sidelink control information using the first set of REs and the sidelink data using the second set of REs comprises: transmitting the sidelink control information using a first transmit power level; and transmitting the sidelink data using a second transmit power level.

Aspect 3: The method of Aspect 2, wherein the first transmit power level is greater than the second transmit power level.

Aspect 4: The method of any of Aspects 1-3, wherein the second set of REs are a subset of REs of the first set of REs.

Aspect 5: The method of any of Aspects 1-3, wherein the first set of REs and the second set of REs are a same set of REs.

Aspect 6: The method of any of Aspects 1-5, wherein the first set of REs are configured for a resource pool associated with the sidelink control information.

Aspect 7: The method of any of Aspects 1-6, wherein the first set of REs are defined, for a resource pool, by a wireless communication standard.

Aspect 8: The method of any of Aspects 1-7, further comprising: receiving configuration information indicating the first set of REs for a resource pool associated with the sidelink control information.

Aspect 9: The method of Aspect 8, wherein the configuration information is received via at least one of a system information block (SIB) message or a radio resource control (RRC) message.

Aspect 10: The method of any of Aspects 1-9, wherein the first set of REs include all REs in a slot or a mini-slot associated with the sidelink control information.

Aspect 11: The method of any of Aspects 1-9, wherein the first set of REs include a subset of REs of a set of REs in a slot or a mini-slot associated with the sidelink control information.

Aspect 12: The method of any of Aspects 1-11, wherein a plurality of sets of REs, including the first set of REs, are activated or configured for sidelink control information messages in a resource pool that is associated with the sidelink control information.

Aspect 13: The method of any of Aspects 1-12, wherein the second set of REs are configured for a resource pool associated with the sidelink data or for a sidelink associated with the sidelink data.

Aspect 14: The method of any of Aspects 1-13, wherein the second set of REs are defined, for a resource pool, by a wireless communication standard.

Aspect 15: The method of any of Aspects 1-14, further comprising: receiving configuration information indicating the second set of REs for a resource pool associated with the sidelink data.

Aspect 16: The method of any of Aspects 1-15, wherein a plurality of sets of REs, including the second set of REs, are configured, in a Layer 3, for sidelink data messages for a resource pool, and the method further comprising: transmitting a dynamic indication that the second set of REs are to be used for the sidelink data.

Aspect 17: The method of Aspect 16, wherein the dynamic indication that the second set of REs are to be used for the sidelink data is included in the sidelink control information.

Aspect 18: The method of any of Aspects 1-17, further comprising: communicating, with the other UE, to establish one or more sets of REs, including the second set of REs, for sidelink data messages, associated with a resource pool, between the UE and the other UE.

Aspect 19: The method of any of Aspects 1-18, wherein the first set of REs include one or more pilot REs that are associated with carrying a demodulation reference signal (DMRS) sequence for the sidelink control information.

Aspect 20: The method of any of Aspects 1-19, wherein the sidelink control information indicates at least one of: an insertion loss associated with a transmit power level of the sidelink data, or an identifier associated with the second set of REs.

Aspect 21: The method of any of Aspects 1-20, wherein the first layer includes sidelink control information (SCI), and wherein the second layer does not include SCI.

Aspect 22: The method of Aspect 21, wherein the SCI included in the first layer is a one-stage SCI.

Aspect 23: The method of Aspect 21, wherein the SCI included in the first layer is a two-stage SCI, wherein a demodulation reference signal (DMRS) associated with the sidelink control information is used to decode a second stage SCI (SCI-2) associated with the SCI included in the sidelink control information, and wherein the SCI-2 includes an indication of at least one of: an insertion loss associated with a transmit power level of the sidelink data, or an identifier associated with the second set of REs.

Aspect 24: The method of any of Aspects 1-23, wherein the second set of REs include one or more pilot REs that are associated with carrying a demodulation reference signal (DMRS) sequence for the sidelink data.

Aspect 25: The method of Aspect 24, wherein the one or more pilot REs are a first one or more pilot REs, and wherein the first one or more pilot REs are a same one or more REs as a second one or more pilot REs, included in the first set of REs, that are associated with carrying a DMRS sequence for the sidelink control information.

Aspect 26: The method of Aspect 24, wherein the one or more pilot REs are a first one or more pilot REs, and wherein the first one or more pilot REs are different than a second one or more pilot REs, included in the first set of REs, that are associated with carrying a DMRS sequence for the sidelink control information.

Aspect 27: The method of any of Aspects 1-26, wherein the first set of REs include one or more REs that do not have SCM applied, and wherein the one or more REs are associated with carrying a demodulation reference signal (DMRS) sequence for the sidelink data.

Aspect 28: The method of any of Aspects 1-27, wherein the second set of REs include one or more REs that do not have SCM applied, and wherein the one or more REs are associated with one or more pilot REs, included in the first set of REs, that are associated with carrying a demodulation reference signal (DMRS) sequence for the sidelink control information.

Aspect 29: The method of any of Aspects 1-28, wherein the first set of REs include one or more REs that do not have SCM applied, and wherein the one or more REs are associated with at least one of: a sidelink channel state information (CSI) reference signal included in the sidelink data, a different modulation scheme for the sidelink data than a modulation scheme used for the second set of REs, or a different rate-matching value than a rate matching value used for the second set of REs, or a second stage sidelink control information (SCI-2) message.

Aspect 30: The method of any of Aspects 1-29, further comprising: receiving, from a base station, a sidelink grant for at least one of the sidelink control information or the sidelink data, wherein the sidelink grant indicates that SCM is to be applied to the first layer and the second layer.

Aspect 31: The method of Aspect 30, wherein the sidelink grant indicates at least one of: an insertion loss associated with a transmit power level of the sidelink data, or an identifier associated with the second set of REs.

Aspect 32: The method of any of Aspects 1-31, wherein transmitting the sidelink control information using the first set of REs and the sidelink data using the second set of REs comprises: transmitting the sidelink control information and the sidelink data using a mini-slot format.

Aspect 33: The method of any of Aspects 1-32, wherein the sidelink control information is included in a physical sidelink control channel (PSCCH) message, and wherein the sidelink data is included in a physical sidelink shared channel (PSSCH) message.

Aspect 34: A method of wireless communication performed by a user equipment (UE), comprising: receiving, from another UE, a first layer associated with a first set of resource elements (REs) and sidelink control information and a second layer associated with a second set of REs and sidelink data, wherein the first layer and the second layer are modulated using superposition coded modulation (SCM), and wherein the first set of REs and the second set of REs are associated with a same one or more symbols; and decoding the first set of REs to obtain information included in the sidelink control information; and decoding, based at least in part on decoding the first set of REs, the second set of REs to obtain information included in the sidelink data.

Aspect 35: The method of Aspect 34, wherein decoding the second set of REs comprises: performing successive interference cancellation (SIC) to the first set of REs based at least in part on an insertion loss associated with a transmit power level of the sidelink data; and decoding the second set of REs based at least in part on performing SIC to the first set of REs.

Aspect 36: The method of any of Aspects 34-35, wherein receiving the first layer and the second layer comprises: receiving the sidelink control information using a first transmit power level; and receiving the sidelink data using a second transmit power level.

Aspect 37: The method of Aspect 36, wherein the first transmit power level is greater than the second transmit power level.

Aspect 38: The method of any of Aspects 34-37, wherein the second set of REs are a subset of REs of the first set of REs.

Aspect 39: The method of any of Aspects 34-37, wherein the first set of REs and the second set of REs are a same set of REs.

Aspect 40: The method of any of Aspects 34-39, wherein the first set of REs are configured for a resource pool associated with the sidelink control information.

Aspect 41: The method of any of Aspects 34-40, wherein the first set of REs are defined, for a resource pool, by a wireless communication standard.

Aspect 42: The method of any of Aspects 34-41, further comprising: receiving configuration information indicating the first set of REs for a resource pool associated with the sidelink control information.

Aspect 43: The method of Aspect 42, wherein the configuration information is received via at least one of a system information block (SIB) message or a radio resource control (RRC) message.

Aspect 44: The method of any of Aspects 34-43, wherein the first set of REs include all REs in a slot or a mini-slot associated with the sidelink control information.

Aspect 45: The method of any of Aspects 34-44, wherein the first set of REs include a subset of REs of a set of REs in a slot or a mini-slot associated with the sidelink control information.

Aspect 46: The method of any of Aspects 34-45, wherein a plurality of sets of REs, including the first set of REs, are activated or configured for sidelink control information messages in a resource pool that is associated with the sidelink control information.

Aspect 47: The method of any of Aspects 34-46, wherein the second set of REs are configured for a resource pool associated with the sidelink data or for a sidelink associated with the sidelink data.

Aspect 48: The method of any of Aspects 34-47, wherein the second set of REs are defined, for a resource pool, by a wireless communication standard.

Aspect 49: The method of any of Aspects 34-48, further comprising: receiving configuration information indicating the second set of REs for a resource pool associated with the sidelink data.

Aspect 50: The method of any of Aspects 34-49, wherein a plurality of sets of REs, including the second set of REs, are configured, in a Layer 3, for sidelink data messages for a resource pool, and the method further comprising: receiving a dynamic indication that the second set of REs are to be used for the sidelink data.

Aspect 51: The method of Aspect 50, wherein the dynamic indication that the second set of REs are to be used for the sidelink data is included in the sidelink control information.

Aspect 52: The method of any of Aspects 34-51, further comprising: communicating, with the other UE, to establish one or more sets of REs, including the second set of REs, for sidelink data messages, associated with a resource pool, between the UE and the other UE.

Aspect 53: The method of any of Aspects 34-52, wherein the first set of REs include one or more pilot REs that are associated with carrying a demodulation reference signal (DMRS) sequence for the sidelink control information.

Aspect 54: The method of any of Aspects 34-53, wherein the sidelink control information indicates at least one of: an insertion loss associated with a transmit power level of the sidelink data, or an identifier associated with the second set of REs.

Aspect 55: The method of any of Aspects 34-54, wherein the first layer includes sidelink control information (SCI), and wherein the second layer does not include SCI.

Aspect 56: The method of Aspect 55, wherein the SCI included in the first layer is a one-stage SCI.

Aspect 57: The method of Aspect 55, wherein the SCI included in the first layer is a two-stage SCI, wherein a demodulation reference signal (DMRS) associated with the sidelink control information is used to decode a second stage SCI (SCI-2) associated with the SCI included in the sidelink control information, and wherein the SCI-2 includes an indication of at least one of: an insertion loss associated with a transmit power level of the sidelink data, or an identifier associated with the second set of REs.

Aspect 58: The method of any of Aspects 34-57, wherein the second set of REs include one or more pilot REs that are associated with carrying a demodulation reference signal (DMRS) sequence for the sidelink data.

Aspect 59: The method of Aspect 58, wherein the one or more pilot REs are a first one or more pilot REs, and wherein the first one or more pilot REs are a same one or more REs as a second one or more pilot REs, included in the first set of REs, that are associated with carrying a DMRS sequence for the sidelink control information.

Aspect 60: The method of Aspect 58, wherein the one or more pilot REs are a first one or more pilot REs, and wherein the first one or more pilot REs are different than a second one or more pilot REs, included in the first set of REs, that are associated with carrying a DMRS sequence for the sidelink control information.

Aspect 61: The method of any of Aspects 34-60, wherein the first set of REs include one or more REs that do not have SCM applied, and wherein the one or more REs are associated with carrying a demodulation reference signal (DMRS) sequence for the sidelink data.

Aspect 62: The method of any of Aspects 34-61, wherein the second set of REs include one or more REs that do not have SCM applied, and wherein the one or more REs are associated with one or more pilot REs, included in the first set of REs, that are associated with carrying a demodulation reference signal (DMRS) sequence for the sidelink control information.

Aspect 63: The method of any of Aspects 34-62, wherein the first set of REs include one or more REs that do not have SCM applied, and wherein the one or more REs are associated with at least one of: a sidelink channel state information (CSI) reference signal included in the sidelink data, a different modulation scheme for the sidelink data than a modulation scheme used for the second set of REs, or a different rate-matching value than a rate matching value used for the second set of REs, or a second stage sidelink control information (SCI-2) message.

Aspect 64: The method of any of Aspects 34-63, further comprising: receiving, from a base station, a sidelink grant for at least one of the sidelink control information or the sidelink data, wherein the sidelink grant indicates that SCM is to be applied to the first layer and the second layer.

Aspect 65: The method of Aspect 64, wherein the sidelink grant indicates at least one of: an insertion loss associated with a transmit power level of the sidelink data, or an identifier associated with the second set of REs.

Aspect 66: The method of any of Aspects 34-65, wherein receiving the first layer and the second layer comprises: receiving the sidelink control information and the sidelink data using a mini-slot format.

Aspect 67: The method of any of Aspects 34-66, wherein the sidelink control information is included in a physical sidelink control channel (PSCCH) message, and wherein the sidelink data is included in a physical sidelink shared channel (PSSCH) message.

Aspect 68: An apparatus for wireless communication at a device, comprising a processor; memory coupled with the processor; and instructions stored in the memory and executable by the processor to cause the apparatus to perform the method of one or more of Aspects 1-33.

Aspect 69: A device for wireless communication, comprising a memory and one or more processors coupled to the memory, the one or more processors configured to perform the method of one or more of Aspects 1-33.

Aspect 70: An apparatus for wireless communication, comprising at least one means for performing the method of one or more of Aspects 1-33.

Aspect 71: A non-transitory computer-readable medium storing code for wireless communication, the code comprising instructions executable by a processor to perform the method of one or more of Aspects 1-33.

Aspect 72: A non-transitory computer-readable medium storing a set of instructions for wireless communication, the set of instructions comprising one or more instructions that, when executed by one or more processors of a device, cause the device to perform the method of one or more of Aspects 1-33.

Aspect 73: An apparatus for wireless communication at a device, comprising a processor; memory coupled with the processor; and instructions stored in the memory and executable by the processor to cause the apparatus to perform the method of one or more of Aspects 34-67.

Aspect 74: A device for wireless communication, comprising a memory and one or more processors coupled to the memory, the one or more processors configured to perform the method of one or more of Aspects 34-67.

Aspect 75: An apparatus for wireless communication, comprising at least one means for performing the method of one or more of Aspects 34-67.

Aspect 76: A non-transitory computer-readable medium storing code for wireless communication, the code comprising instructions executable by a processor to perform the method of one or more of Aspects 34-67.

Aspect 77: A non-transitory computer-readable medium storing a set of instructions for wireless communication, the set of instructions comprising one or more instructions that, when executed by one or more processors of a device, cause the device to perform the method of one or more of Aspects 34-67.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising: one or more processors; and the one or more processors, coupled to one or more memories, configured to: encode, for a first set of resource elements (REs), a first layer for sidelink control information; encode, for a second set of REs, a second layer for sidelink data, wherein the first set of REs and the second set of REs are associated with a same one or more symbols; and transmit, to another UE and based at least in part on applying superposition coded modulation (SCM) to the first layer and the second layer, the sidelink control information using the first set of REs and the sidelink data using the second set of REs wherein at least one of: the first set of REs include one or more first pilot REs that are associated with carrying a first demodulation reference signal (DMRS) sequence for the sidelink control information, or the second set of REs include one or more second pilot REs that are associated with carrying a second DMRS sequence for the sidelink data.

2. The UE of claim 1, wherein the one or more processors, to transmit the sidelink control information using the first set of REs and the sidelink data using the second set of REs, are configured to: transmit the sidelink control information using a first transmit power level; and transmit the sidelink data using a second transmit power level.

3. The UE of claim 1, wherein the one or more processors are further configured to: receive configuration information indicating the first set of REs for a resource pool associated with the sidelink control information.

4. The UE of claim 1, wherein a plurality of sets of REs, including the first set of REs, are activated or configured for sidelink control information messages in a resource pool that is associated with the sidelink control information.

5. The UE of claim 1, wherein the second set of REs are configured for a resource pool associated with the sidelink data or for a sidelink associated with the sidelink data.

6. The UE of claim 1, wherein a plurality of sets of REs, including the second set of REs, are configured, in a Layer 3, for sidelink data messages for a resource pool, and wherein the one or more processors are further configured to: transmit a dynamic indication that the second set of REs are to be used for the sidelink data.

7. The UE of claim 1, wherein the one or more processors are further configured to: communicate, with the other UE, to establish one or more sets of REs, including the second set of REs, for sidelink data messages, associated with a resource pool, between the UE and the other UE.

8. The UE of claim 1, wherein the first set of REs include the one or more first pilot REs that are associated with carrying the first DMRS sequence for the sidelink control information.

9. The UE of claim 1, wherein the sidelink control information indicates at least one of: an insertion loss associated with a transmit power level of the sidelink data, or an identifier associated with the second set of REs.

10. The UE of claim 1, wherein the first layer includes sidelink control information (SCI), and wherein the second layer does not include SCI.

11. The UE of claim 1, wherein the second set of REs include the one or more second pilot REs that are associated with carrying the second DMRS sequence for the sidelink data.

12. The UE of claim 1, wherein the first set of REs include one or more REs that do not have SCM applied, and wherein the one or more REs are associated with carrying the second DMRS sequence for the sidelink data.

13. The UE of claim 1, wherein the second set of REs include one or more REs that do not have SCM applied, and wherein the one or more REs are associated with the one or more pilot REs, included in the first set of REs, that are associated with carrying the first DMRS sequence for the sidelink control information.

14. The UE of claim 1, wherein the first set of REs include one or more REs that do not have SCM applied, and wherein the one or more REs are associated with at least one of: a sidelink channel state information (CSI) reference signal included in the sidelink data, a different modulation scheme for the sidelink data than a modulation scheme used for the second set of REs, or a different rate-matching value than a rate matching value used for the second set of REs, or a second stage sidelink control information (SCI-2) message.

15. The UE of claim 1, wherein the one or more processors are further configured to: receive, from a base station, a sidelink grant for at least one of the sidelink control information or the sidelink data, wherein the sidelink grant indicates that SCM is to be applied to the first layer and the second layer.

16. A method of wireless communication performed by a user equipment (UE), comprising: encoding, for a first set of resource elements (REs), a first layer for sidelink control information; encoding, for a second set of REs, a second layer for sidelink data, wherein the first set of REs and the second set of REs are associated with a same one or more symbols; and transmitting, to another UE and based at least in part on applying superposition coded modulation (SCM) to the first layer and the second layer, the sidelink control information using the first set of REs and the sidelink data using the second set of REs wherein at least one of: the first set of REs include one or more first REs that do not have SCM applied, and the one or more first REs are associated with carrying a first demodulation reference signal (DMRS) sequence for the sidelink data, or the second set of REs include one or more second REs that do not have SCM applied, and the one or more second REs are associated with one or more pilot REs, included in the first set of REs, that are associated with carrying a second DMRS sequence for the sidelink control information.

17. The method of claim 16, wherein transmitting the sidelink control information using the first set of REs and the sidelink data using the second set of REs comprises: transmitting the sidelink control information using a first transmit power level; and transmitting the sidelink data using a second transmit power level.

18. The method of claim 16, further comprising: receiving configuration information indicating the first set of REs for a resource pool associated with the sidelink control information.

19. The method of claim 16, wherein a plurality of sets of REs, including the first set of REs, are activated or configured for sidelink control information messages in a resource pool that is associated with the sidelink control information.

20. The method of claim 16, wherein the second set of REs are configured for a resource pool associated with the sidelink data or for a sidelink associated with the sidelink data.

21. The method of claim 16, wherein a plurality of sets of REs, including the second set of REs, are configured, in a Layer 3, for sidelink data messages for a resource pool, and the method further comprising: transmitting a dynamic indication that the second set of REs are to be used for the sidelink data.

22. The method of claim 16, wherein the first set of REs include one or more pilot REs that are associated with carrying the second DMRS sequence for the sidelink control information.

23. The method of claim 16, wherein the sidelink control information indicates at least one of:
an insertion loss associated with a transmit power level of the sidelink data, or an identifier associated with the second set of REs.

24. The method of claim 16, wherein the first layer includes sidelink control information (SCI), and wherein the second layer does not include SCI.

25. The method of claim 16, wherein the second set of REs include one or more pilot REs that are associated with carrying the first DMRS sequence for the sidelink data.

26. The method of claim 16, wherein the first set of REs include the one or more first REs that do not have SCM applied.

27. The method of claim 16, wherein the second set of REs include the one or more second REs that do not have SCM applied.

28. The method of claim 16, further comprising: receiving, from a base station, a sidelink grant for at least one of the sidelink control information or the sidelink data, wherein the sidelink grant indicates that SCM is to be applied to the first layer and the second layer.

29. A user equipment (UE) for wireless communication, comprising: one or more processors; and the one or more processors, coupled to one or more memories, configured to: encode, for a first set of resource elements (REs), a first layer for sidelink control information; encode, for a second set of REs, a second layer for sidelink data, wherein the first set of REs and the second set of REs are associated with a same one or more symbols; and transmit, to another UE and based at least in part on applying superposition coded modulation (SCM) to the first layer and the second layer, the sidelink control information using the first set of REs and the sidelink data using the second set of REs, wherein the first set of REs include one or more REs that do not have SCM applied, and wherein the one or more REs are associated with at least one of: a sidelink channel state information (CSI) reference signal included in the sidelink data, a different modulation scheme for the sidelink data than a modulation scheme used for the second set of REs, or a different rate-matching value than a rate matching value used for the second set of REs, or a second stage sidelink control information (SCI-2) message.

30. A user equipment (UE) for wireless communication, comprising: one or more processors; and the one or more processors, coupled to one or more memories, configured to: receive, from a base station, a sidelink grant for at least one of sidelink control information or sidelink data, wherein the sidelink grant indicates that superposition coded modulation (SCM) is to be applied to a first layer for the sidelink control information and a second layer for the sidelink data; encode, for a first set of resource elements (REs), the first layer for the sidelink control information; encode, for a second set of REs, the second layer for the sidelink data, wherein the first set of REs and the second set of REs are associated with a same one or more symbols; and transmit, to another UE and based at least in part on SCM to the first layer and the second layer, the sidelink control information using the first set of REs and the sidelink data using the second set of REs.

* * * * *